(12) United States Patent
Beaver, III et al.

(10) Patent No.: US 12,073,148 B2
(45) Date of Patent: Aug. 27, 2024

(54) METHOD AND MEDIA FOR GENERATING AND USING DIGITAL PRODUCT TOKENS TO REPRESENT DIGITAL AND PHYSICAL PRODUCTS

(71) Applicant: ZAZZLE INC., Redwood City, CA (US)

(72) Inventors: Robert I. Beaver, III, San Francisco, CA (US); Jeffrey J. Beaver, San Francisco, CA (US); Sean Narvasa, Oakland, CA (US); Leslie Young Harvill, Olympia, WA (US); Petar S. Ivanov, Redwood City, CA (US); Parker H. Bossier, New York, NY (US); Christopher Collette, Los Altos, CA (US)

(73) Assignee: ZAZZLE, INC., Menlo Park, CA (US)

( * ) Notice: Subject to any disclaimer, the term of this patent is extended or adjusted under 35 U.S.C. 154(b) by 559 days.

(21) Appl. No.: 17/193,512

(22) Filed: Mar. 5, 2021

(65) Prior Publication Data
US 2021/0192097 A1     Jun. 24, 2021

Related U.S. Application Data

(63) Continuation-in-part of application No. 17/038,659, filed on Sep. 30, 2020.
(Continued)

(51) Int. Cl.
*G06Q 30/00* (2023.01)
*G06F 9/451* (2018.01)
(Continued)

(52) U.S. Cl.
CPC ............. *G06F 30/10* (2020.01); *G06F 9/451* (2018.02); *G06F 16/71* (2019.01); *G06Q 30/016* (2013.01);
(Continued)

(58) Field of Classification Search
CPC .......... G06F 30/10; G06F 9/451; G06F 16/71; G06F 2111/02; G06F 2111/04;
(Continued)

(56) References Cited

U.S. PATENT DOCUMENTS

2010/0299616 A1\* 11/2010 Chen .................. G06Q 30/0601
715/753
2012/0221136 A1   8/2012 Yucel et al.
(Continued)

FOREIGN PATENT DOCUMENTS

WO   WO 2013/033643 A1   3/2013
WO   WO 2016/054651      4/2016

OTHER PUBLICATIONS

H. Xie, Tracking of design changes for collaborative product development, 2001, Proceedings of the Sixth International Conference on Computer Supported Cooperative Work in Design (IEEE Cat. No. 01EX472), London, ON, Canada, pp. 175-180. (Year: 2001).\*

(Continued)

*Primary Examiner* — Jeffrey A. Smith
*Assistant Examiner* — Brittany E Bargeon
(74) *Attorney, Agent, or Firm* — Patterson & Sheridan LLP; Malgorzata A. Kulczycka

(57) ABSTRACT

In some embodiments, a computer-implemented method for generating digital product tokens to represent digital and physical products is presented. The method comprises: storing a plurality of key-value pairs associated with an interactive digital design at a location in storage; based on the plurality of key-value pairs, generating product description data and a token indicating the location at which the plurality of key-value pairs is stored; embedding the token into the product description data; and in response to receiving a request for a product corresponding to the interactive digital (Continued)

design, transmitting the product description data with the token to a manufacturing entity to cause the manufacturing entity to extract the token from the product description data, use the token to retrieve the plurality of key-value pairs from the location, and use the plurality of key-value pairs to generate manufacturing instructions for manufacturing the product corresponding to the interactive digital design.

20 Claims, 12 Drawing Sheets

Related U.S. Application Data

(60) Provisional application No. 62/924,275, filed on Oct. 22, 2019.

(51) Int. Cl.
*G06F 16/71* (2019.01)
*G06F 30/10* (2020.01)
*G06Q 30/016* (2023.01)
*G06F 111/02* (2020.01)
*G06F 111/04* (2020.01)

(52) U.S. Cl.
CPC ....... *G06F 2111/02* (2020.01); *G06F 2111/04* (2020.01)

(58) Field of Classification Search
CPC ............. G06Q 30/016; G06Q 30/0621; G06Q 10/101; G06Q 50/04; Y02P 90/30
See application file for complete search history.

(56) References Cited

U.S. PATENT DOCUMENTS

| | | |
|---|---|---|
| 2013/0060801 A1 | 3/2013 | Beaver, III et al. |
| 2013/0173714 A1 | 7/2013 | D'Amore et al. |
| 2015/0016661 A1* | 1/2015 | Lord ................ H04N 21/42203 382/100 |
| 2015/0324490 A1* | 11/2015 | Page .................. G06Q 30/0621 700/98 |
| 2017/0199645 A1* | 7/2017 | Troy ................... G06F 3/04815 |
| 2017/0346807 A1 | 11/2017 | Blasi |
| 2018/0115603 A1 | 4/2018 | Hu et al. |
| 2018/0183892 A1* | 6/2018 | Al Sabawi .......... H04L 67/1095 |
| 2018/0307794 A1 | 10/2018 | Bowman et al. |
| 2019/0108292 A1* | 4/2019 | Bowen .................. G06N 5/046 |
| 2020/0201294 A1* | 6/2020 | Nelson .................. G06F 21/602 |
| 2020/0257775 A1 | 8/2020 | Wright et al. |
| 2021/0118031 A1 | 4/2021 | Beaver, III |

OTHER PUBLICATIONS

Office Action dated Mar. 10, 2023 for U.S. Appl. No. 17/143,955.
The International Searching Authority, "Search Report" in application No. PCT/US2020/053585, dated Dec. 15, 2020, 13 pages.
Current Claims in application No. PCT/US2020/053585, dated Dec. 2020, 5 pages.
The International Searching Authority, "Search Report" in Application No. PCT/US2022/39571, dated Nov. 4, 2022, 11 pages.
US Office Action dated May 24, 2023 for U.S. Appl. No. 17/038,659.
Final Office Action dated Jun. 16, 2023 for U.S. Appl. No. 17/143,955.
Office Action dated Aug. 17, 2023 for U.S. Appl. No. 17/143,955.
US Final Office Action dated Nov. 2, 2023 for U.S. Appl. No. 17/038,659.

* cited by examiner

US 12,073,148 B2

METHOD AND MEDIA FOR GENERATING AND USING DIGITAL PRODUCT TOKENS TO REPRESENT DIGITAL AND PHYSICAL PRODUCTS

BENEFIT CLAIM; CROSS REFERENCE TO RELATED APPLICATIONS

This application claims the benefit under 35 U.S.C. § 121 as a continuation-in-part application of non-provisional application Ser. No. 17/038,659, filed Sep. 30, 2020, which claims the benefit under 35 U.S.C. § 119 of provisional application 62/924,275, filed Oct. 22, 2019, the entire contents of which are hereby incorporated by reference for all purposes as if fully set forth herein.

This application is related to U.S. Pat. No. 8,090,461, granted Jan. 3, 2012; U.S. Pat. No. 8,175,931, granted May 8, 2012; U.S. Pat. No. 8,856,160, granted Oct. 7, 2014; U.S. Pat. No. 9,355,421, granted on May 31, 2016; U.S. Pat. No. 9,400,997, granted Jul. 26, 2016; U.S. Pat. No. 10,176,617, granted Jan. 8, 2019; and US patent application no. 2013/0060654, filed Aug. 29, 2012; the entire contents of each of which are hereby incorporated by reference for all purposes as if fully set forth herein.

FIELD OF THE DISCLOSURE

One technical field of the disclosure pertains to digital product tokens and using the tokens to represent digital and physical products. Another technical field pertains to embedding the digital tokens in digital descriptions of digital designs. Yet another technical field pertains to transmitting the digital descriptions with the embedded tokens to a digital authority to extract the tokens from the received data and using the tokens to retrieve manufacturing instructions for manufacturing the digital and physical products.

BACKGROUND

Over the years, computer-implemented collaboration applications have become quite popular. Early examples of the collaboration applications include tools for collaborative text editing, text messaging, and shared-calendar planning. Other collaboration applications offer shared spreadsheets, video conferencing, and picture sharing applications.

The recent innovations in the computer technologies have stimulated the development of collaboration platforms and applications for designing digital products. A digital product is a product that can be constructed, delivered, and presented to users digitally. Due to many recent technological advances, many digital products may be customized online as the users collaborate with each other as they create and improve their interactive digital designs. The collaboration platform may also provide the functionalities for ordering digital files that capture the interactive digital designs. Furthermore, the collaboration platform may provide the functionalities for ordering physical products corresponding to the digital designs.

Customization of interactive products and ordering the products may, however, include navigating through countless sets of attributes of the products and ordering options.

Therefore, there is a need to develop and provide collaboration functionalities for encoding characteristics and attributes of interactive designs in digital forms that can be conveniently shared with manufacturers and other digital product delivery platforms.

SUMMARY

The appended claims may serve as a summary of the disclosure.

DETAILED DESCRIPTION

Figure 1:
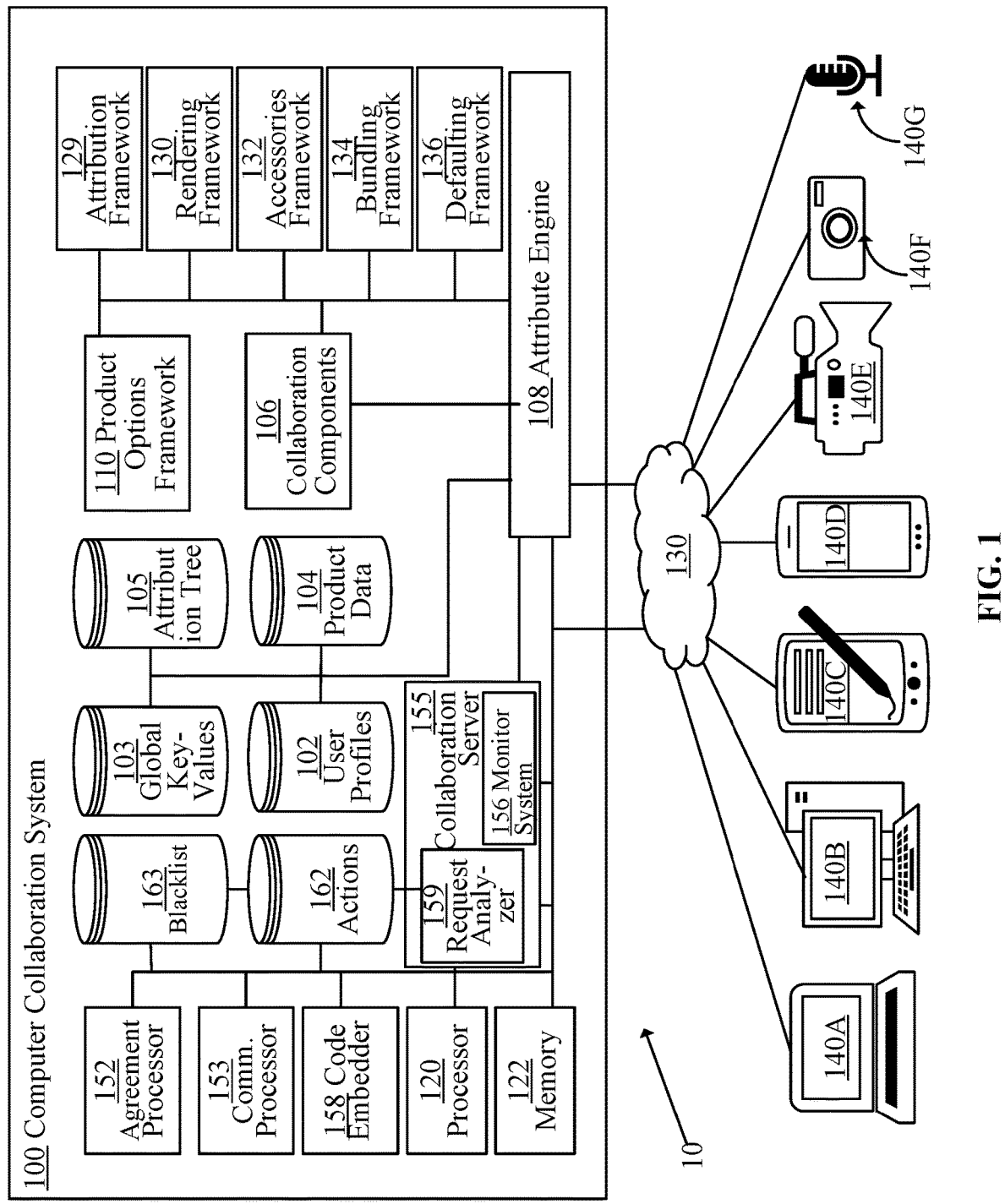
FIG. 1 is a block diagram showing an example computer system for providing a role-based collaborative platform.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach. Embodiments are disclosed in sections according to the following outline:

1. GENERAL OVERVIEW
1.1. ROLE-BASED COLLABORATION
1.2. DIGITAL PRODUCT TOKENS REPRESENTING DIGITAL DESIGNS
1.3. DIGITAL PRODUCT TOKENS REPRESENTING DIGITAL AND PHYSICAL PRODUCTS
2. ROLE-BASED COLLABORATION PLATFORMS
2.1. USER ROLES
2.2. COLLABORATION DATA
    2.2.1. USER PROFILES
    2.2.2. PRODUCT DEFINITIONS
    2.2.3. ATTRIBUTE REPRESENTATIONS
    2.2.4. GLOBAL-KEY-VALUES
        2.2.4.1. CONSTRAINTS
        2.2.4.2. TRANSACTIONS
    2.2.5. ATTRIBUTION TREES
    2.2.6. COLLABORATION COMPONENTS 2.2.6.1. USER INTERFACE ELEMENTS
2.2.6.2. USER INTERFACE ELEMENTS FOR DESIGN AREAS
2.2.6.3. CUSTOMIZED PRODUCTS
2.2.6.4. PRODUCTS DURING A CUSTOMIZATION PHASE
2.2.6.5. REPRESENTATIONS OF PRODUCT VIEWS
2.3. PRODUCT OPTIONS FRAMEWORK
2.4. ATTRIBUTE ENGINES
2.5. USER DEVICES
2.6. COLLABORATION SERVER
2.7. MONITORING SYSTEM
2.8. PROCESSORS
3. DIGITAL PRODUCT TOKENS REPRESENTING DIGITAL DESIGNS
3.1. TOKENS
3.2. GENERATING AND EMBEDDING TOKENS
3.3. USING TOKENS
3.4. EXTRACTING AND USING TOKENS
4. USING DIGITAL PRODUCT TOKENS TO OBTAIN DIGITAL AND PHYSICAL PRODUCTS
4.1. MANUFACTURING PROCESS
4.2. USING TOKENS TO REQUEST PRODUCTS
4.3. USING TOKENS TO FACILITATE MODIFICATIONS
4.4. USING TOKENS TO RETRIEVE DIGITAL DESIGNS
5. ATTRIBUTION TRACKING
5.1. INITIALIZATION
5.2. INVITING OTHERS TO COLLABORATE
5.3. UPDATING GLOBAL-KEY-VALUES
5.4. TRANSMITTING MODIFICATIONS TO A FRAMEWORK
5.5. STORING GLOBAL-KEY-VALUES
6. EXAMPLE GRAPHICAL USER INTERFACES
6.1. COLLABORATION REQUEST SELECTORS
6.2. EXAMPLE COMPONENTS OF A GUI
6.3. GUI FUNCTIONALITIES
6.4. CREATING AND MODIFYING INTERACTIVE DIGITAL DESIGN S
7. COLLABORATION EXAMPLES
7.1. CUSTOMER-AGENT COLLABORATION
7.2. CUSTOMER-PEER COLLABORATION
7.3. EDUCATIONAL AND MANAGEMENT COLLABORATION
7.4. COLLABORATION USING SERIALIZED STREAMS
7.5. PUBLISHING
7.6. PLAYBACK COLLABORATION
7.7. JOURNALED LIST COLLABORATION
7.8. TAGGING
8. MANUFACTURE OF CUSTOM DIGITAL PRODUCTS
9. IMPROVEMENTS PROVIDED BY CERTAIN EMBODIMENTS
10. IMPLEMENTATION MECHANISMS

1. General Overview 1.1. Role-Based Collaboration

In some embodiments, a computer-implemented data processing method, computer system or computer program execute to facilitate and automate collaboration between computer users in customizing interactive digital designs of products. The collaboration may include a collaborative customization of digital product designs and tracking of the collaboration attribution to the designs during the customization process.

The customization may include receiving, at a computer collaboration server, product description data for an interactive digital design. The product description data for the interactive digital design may include data describing how to generate a graphical visual representation of the interactive product and how to generate physical products that are capable of custom manufacture.

The product description data may comprise a plurality of global-key-value pairs journaled within the product description data as the interactive digital design is customized by collaborating users, designers, and support engineers. A global-key-value pair usually includes a key and a value associated with the key. In a pair, a key corresponds to a keyword representing an attribute, while a value corresponds to a value of the attribute. The global-key-value pair is referred to as global because it is global to a current collaboration session. In a global pair, while the key has a persistent meaning across all transactions, the value is scoped to a specific collaboration session. Global key-values possess a 'global' key known across a specific product line, such global key-values may be created, and its value modified during a particular collaboration session are journaled and saved for that particular collaboration session.

A plurality of global-key-value pairs journaled within product description data may be initiated when a customization session for customizing an interactive digital design is initiated. The plurality of global-key-value pairs may be updated each time when, for example, a contributor, who has been granted a valid license and who participates in the customization session, provides modifications to the interactive digital design. The plurality of global-key-value pairs may carry license agreement information and restriction information specific to the customization session and the interactive digital design.

Examples of global-key-value pairs for an interactive digital design may include: an age restriction key-value that includes an age restriction key and an age value; a content lock key-value that includes a content lock key and a content lock key value; a blacklist key-value that includes a blacklist key and a blacklist; a whitelist key-value that includes a whitelist key and a whitelist; an ownership key-value that includes an ownership key and a user universally unique identifier (user ID); a copyright key-value that includes a copyright key and a user ID; a license key-value that includes a license key and a universally unique identifier for a specific license agreement held between an owner or a primary designer and a computer collaboration server; a customer support key-value that includes a support key and a support agent contract identifier; and an attribution key-value that includes an attribution key and a universally unique identifier that references a set of software instructions for manufacturing to apply a marking on a product as may be directed by copyright or licensing agreements.

Based on the plurality of global-key-value pairs for the interactive digital design, an ownership-attribution tree for the interactive digital design is constructed. An ownership-attribution tree may be represented as a graph that captures the relationships between the contributors participating in creating the interactive design, the contributors' roles, the contributors' licenses, the contributors' ownership rights, and other information pertaining to contracts and agreements between the contributors.

Based on the ownership-attribution tree and the key-value pairs for the interactive digital design, manufacturing instructions for manufacturing the digital or physical product corresponding to the interactive digital design are generated. The ownership key-value may affect the creation of the product, causing ownership, copyright, or attribution text to be placed in a particular fashion. A digital product is a product that may be delivered and represented digitally, while a physical product is a physical thing corresponding to the interactive design. The manufacturing instructions may be transmitted to a manufacturing entity to cause the manufacturing entity to use the manufacturing instructions to manufacture the customized digital or physical product.

In some embodiments, the product description data for the interactive digital design is modified as one or more modifications to the interactive digital design are received from user interfaces implemented by the computers used by users to update the interactive digital design. Upon detecting that no further modifications for the interactive digital design are provided, the plurality of global-key-value pairs journaled within the product description data is stored in a global-key-values database.

1.2. Digital Product Tokens Representing Digital Designs

In some embodiments, a method for using digital product tokens to represent custom digital products and custom physical products is presented. A digital token is digital information that references in some way a plurality of key-value pairs that has been journaled during an interactive process of creating an interactive design and stored at some location in storage. The plurality of key-value pairs describes the interactive design and may be used to generate manufacturing instructions for manufacturing a product corresponding to the interactive design. The pairs may be stored in, for example, a collaboration platform or a cloud system available to collaborators and manufacturers. The location may be identified using, for example, a universal unique identifier (UUID) or a URL. The token may correspond to, for example, the UUIM and may be made available to the collaborators and the manufacturers to make the plurality of key-value pairs available to the collaborators and conveniently shared with the manufacturers and other digital product delivery platforms.

In the present method, a digital product token is represented purely digitally. For example, the token may be represented as a universal unique identifier (UUID) that uniquely identifies a plurality of key-value pairs for an interactive design, or points to a location at which the plurality of key-value pairs for the interactive design has been stored. The token may also be a URL pointing to the location at which the plurality of key-value pairs has been stored.

Generally, a digital token is understood to be either an UUID of a plurality of key-value pairs (constraints) or an actual representation of the plurality of key-value pairs (constraints). Unless specified otherwise, for simplicity of the description, the digital token corresponds (or points to) the plurality of the key-value pairs.

A plurality of the pairs may be used to generate a variety of forms of the digital product. For example, suppose that a user uploaded a photograph to a website specializing in providing image-retouching services and a designer or an artist affiliated with the website retouched the uploaded image. Once the retouched image is approved by the user, a digital token for the retouched image is created. The token may be a UUID identifying the key-value pairs or a URL pointing to a location where the key-value pairs are stored. The pairs may be used to generate manufacturing instructions for generating various forms of the retouched image.

Furthermore, the token may be used to retrieve the key-value pairs, which in turn may be used to generate a digital representation of the retouched image, as well as to generate a digital image file (e.g., a tiff file, a jpeg file, or the like) representing the retouched image. Moreover, the plurality of key-value pairs may be used to generate a video file representing an interactive process of generating the interactive digital design.

1.3. Digital Product Tokens Representing Digital and Physical Products

In some embodiments, a token captures, or points to, manufacturing instructions for a product that may be created and sold purely digitally and/or sold as a physical product. The token itself may be delivered digitally and consumed digitally rather than being physically created and physically printed. Additionally, a token may represent a link to (URL) to a set of interactions that may produce a new product. The character of this new product may be specified in the Product Description of the product carrying the token.

In this context, manufacturing instructions may be understood as the instructions for generating and delivering a digital product, as well as the instructions for generating and delivering a physical product corresponding to the digital product. In fact, as it will be explained later, in some situations, both types of the instructions may be the same manufacturing instructions.

Throughout this disclosure, a manufacturing process pertains to manufacturing a digital product as well as manufacturing a physical product of an interactive product. Since the manufacturing instructions for generating a product are generated based on the same plurality of key-value pairs for the interactive product, in some situations, the same manufacturing instructions may be used to "manufacture" the digital product as well as to manufacture the physical product.

A digital token indicating or capturing a plurality of key-value pairs may be embedded in product description data generated for an interactive design, and the product description data having the embedded token may be communicated to a manufacturing entity to cause the manufacturing entity to retrieve, using the token, the plurality of key-value pairs and use the pairs to generate manufacturing instructions for manufacturing a digital custom product (such as a graphical depiction of a digital image) and/or a physical custom product (such as a physical photograph) corresponding to the digital image.

A digital token of a digital product indicates, or points to, a plurality of key-value pairs that corresponds to an associated set of constraints. The constraints may correspond to a set of options of a corresponding digital product (e.g., a digital greeting card) and/or a physical product (e.g., a physical greeting card). The set of constraints associated with the token may capture all the options of the digital product as well as of the physical product. The constraints may include, for example, a set of colors schemes used to represent the digital product, a set of sizes and aspect ratios of the digital product, a set of images included in the digital product, a set of fonts and font sizes used to represent the text included in the digital product, and the like.

The constraints may also include indications as to how the digital product may be delivered to a user. The options may indicate, for example, that the digital product may be delivered on a smartphone, a particular type or brand of a smartphone, in a web browser, and the like.

The options may be used to optimize other constraints of the token. For example, if the constraints specify that the digital product may be delivered on an older model of a smartphone and that model is known from displaying images at a low resolution, then before the digital product is delivered for displaying on that smartphone, a digital representation of the product may be optimized to compensate for the low resolution capabilities of the display device of the smartphone.

In some embodiments, a digital token is defined by a set of constraints that represent the digital product. The constraints may include not only a set of options for the digital product but also a set of instructions for manufacturing the digital product. The token may be digitally provided to, for example, a product option framework (described in detail later) and then to a digital manufacturing process to produce and generate the digital product.

A set of constraints associated with a token may be captured in a set of key-value pairs created as an interactive digital design is created. A set of key-value pairs for a digital product comprises a set of pairs that capture attributes associated with the digital product and the attribute values corresponding to the attributes. More specifically, a key-value pair includes a keyword indicating a type of the attribute and a value indicating the value of the attribute. Examples of the attributes may include the options described above, such as colors, color schemes, a size of the digital product, an aspect ratio of the digital product, and the like, as well as the attributes pertaining to, for example, license agreements, attribution, content restriction, contribution agreements, and the like. Examples of the key-value pairs are described in FIG. 2C.

A digital product, such as a digital greeting card, may have a set of constraints capturing a size of digital greeting card, an indication of a display device on which the digital greeting card may be displayed, a display resolution that may be used to generate a digital representation of the digital greeting card, and the like. Some of the constraints may be used to optimize the digital representation of the digital product to be able to fully utilize the display capabilities of the display device on which the digital product is to be displayed.

Constraints captured using a set of key-value pairs for a digital product may be translated to a set of manufacturing instructions that can be used to generate a digital representation of the digital product and/or to generate a physical product corresponding to the digital product. The manufacturing instructions may include both the instructions for generating the digital product and the instructions for generating the physical product.

In fact, in some implementations, the instructions for generating a digital product are the same as the instructions for generating a physical product corresponding to an interactive design. In some other implementations, however, the instructions for generating a digital product are different than the instructions for generating a physical product. For example, the manufacturing instructions for generating a digital product may indicate, for example, how to display the digital product on a display device, a digital media, or a digital printer, while the manufacturing instructions for generating a physical product may indicate, for example, how to generate physical components of the physical product and how to assemble the physical components into a resulting physical product that may be physically shipped to a customer.

A set of manufacturing instructions generated for a digital product may be translated to, for example, an Adobe™ PDF output that may be then sent to a display device or a digital printer for processing and ultimately used to display or print the product. Alternatively, the manufacturing instructions may be captured in the Adobe™ PDF file, then translated from the PDF to a PostScript output, and then used to generate a display of the digital product on a display device. The process of translating the manufacturing instructions to the instructions for displaying the digital product on a display device is referred to as a rip process.

Suppose that, through an interactive collaboration process, users, designers, and graphics artists designed a digital representation of a mug. As the mug is designed, the process of creating the mug may be recorded, and a corresponding set of key-value pairs associated with the digital design may be created to capture the attributes and the attributes' values of the mug. Furthermore, once the mug is designed, each collaboration key-value change may produce an image of the product, creating a series of frames depicting the process of creating the mug, or an animation of the mug creating may be captured. The series of frames may be used to create a video clip to depict the animation of the creation of the mug. The video animation may be encoded, and a link provided to a video-playing platform or a video-playing device for playing the animation.

Graphical representations of products that are available to users in either a digital form or a physical form may be displayed on display devices communicating with a collaboration platform. A particular product may be selected by a user by selecting a graphical representation of the particular product shown on a display device. Selecting a digital representation of a digital product may cause generating a request to the collaboration platform to display, for example, a web page providing the functionalities for ordering the selected particular product as either a digital product or a physical product. Ordering the selected product may trigger providing, to the platform, a digital token associated with the selected digital product. The token itself may be embedded as a watermark in product description data associated with the selected digital product. Examples of different ways of embedding the token as a watermark in the product description data are described later. The token may be, for example, a UUID identifying a plurality of key-value pairs for the product or a URL pointing to a location at which the plurality of key-value pairs for the product are saved. Alternatively, the token itself may comprise the plurality of the key-value pairs for the selected product. Once the plurality of key-value pairs is provided to the collaboration platform, the platform may either use the pairs to generate manufacturing instructions for generating a digital product of the selected product or transmit the product description data with the embedded token to a manufacturing entity or platform to cause the entity to generate manufacturing instructions for generating a physical product of the selected product.

A plurality of product option key-value pairs may also be used to generate a 3D model of a digital product. The 3D model may be incorporated in, for example, a 3D animation such as a 3D video game, and the like. Based on the plurality of key-value pairs, a token may be generated, stored in the association with the digital product, and embedded in, for example, the 3D animation. If the 3D animation is played using a video-playing platform and during the playing a user clicks on a depiction of the digital product for which the token has been embedded in the 3D animation, then the selection may trigger displaying a hyperlink directing the user to a collaboration platform (or a website) that facilitates ordering the 3D animation, ordering a digital representation of the featured digital product, ordering a physical customized product corresponding to the digital design featured in the 3D animation, and the like.

According to another example, if a 3D animation of an interactive digital product design is incorporated into a video game (such as Second Life), and if a user reaches a certain level in playing the video game, then the token representing, for example, a digital design of a mug, may be displayed in a separate window to allow the user to receive the mug as a reward in recognition that the user reached the certain level in playing the game.

In addition to the above described examples of interactive digital designs (including digital greeting cards), the digital designs may also include other virtual product, such as digital invitations, digital business identifiers, logos, email and social media tags, digital announcements of events such as birth, engagement, marriage or death, digital announcements of personal events, digital announcements of business-related events, digital corporate communications, and the like.

2. Role-Based Collaboration Platform

FIG. 1 is a block diagram showing an example computer collaboration system for providing a role-based and attribution-tracking collaborative platform. FIG. 1, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In some embodiments, including an embodiment depicted in FIG. 1, a computer collaboration system 100 includes a user profiles database 102, a product data definitions database 104, a global-key-values database 103, an attribution trees database 105, collaboration components 106, a product options framework 110, an attribute engine 108, one or more processors 120, one or more memory units 122, and one or more frameworks 129-136.

Furthermore, computer collaboration system 100 includes a collaboration server 155, a monitoring system 156, a request analyzer 159, one or more blacklist databases 163, one or more actions databases 162, an agreement processor 152, a communications processor 153, and a code embedder 158. Computer collaboration system 100 may communicate directly, or via one or more communications networks 130, with one or more user devices 140A-140G, all described in detail below.

Computer collaboration system 100 shown in FIG. 1 is provided herein to illustrate clear examples and should not be considered as limiting in any way. Other computer collaboration systems may include additional components such as computer servers, various input/output devices, and additional software and/or hardware components that are not depicted in FIG. 1. Other computer collaboration systems may be implemented in cloud-based systems, distributed computer networks, and the like. Other computer collaboration systems may include fewer components than example computer collaboration system 100 shown in FIG. 1.

2.1. User Roles

A role assigned to a user is a function assumed or played by the user who participates in a collaboration session established to create an interactive design. Various roles may be assigned to users who interact with computer collaboration system 100 via user devices 140A-140G. Examples of roles may include a customer role, a customer support agent role, a graphics designer role, a customer peer role, and a customer product artist role. Based on the assigned roles, the users may be granted access to a product description of an interactive digital design as editors, viewers, managers, and the like.

A customer role may be assigned to a user who is a customer and who wants to customize one or more interactive digital designs offered by platform 10. A customer may, for example, edit/modify attributes of an interactive object, view a rendering of the customized design, publish the customized design, request that another user (a designer or a customer support agent) modify the interactive digital design according to the users' description, request a list of modifications that the user proposed for the interactive digital design, and/or delete or revert some of the modifications included in the list.

A customer support agent role may be assigned to a user who may assist other users in customizing an interactive digital design. A customer support agent may, for example, help in modifying the interactive digital design, provide various views of the rendered design, publish the rendered design on behalf of the user, and the like.

A graphics designer role may be assigned to a user who may assist in defining attributes for an interactive digital design, defining default values for the attributes for the design, defining ranges of the values for the attributes for the design, and/or customizing the interactive digital design. For example, a graphics designer may define a set of attribute-default values pair and store the pairs in product data definitions 104. A graphics designer may also define a set of roles that may be assigned to the users and store the set of roles in user profiles 102.

A customer peer role may be assigned to a user who may view an interactive digital design customized by someone else. A customer peer may, for example, view the interactive digital design (as a customer is customizing the design) and provide comments or feedback on the design to the customer. A customer peer may be granted access to a product description for the customized design, and in some embodiments, may modify the attributes associated with the design.

A customer product artist role may be assigned to a user who may provide tutorials and online help in customizing interactive digital designs. A customer product artist may define attributes for the designs, determine default values for the attributes, determine ranges of values for the attributes, determine the roles for the user who may be allowed to customize the interactive digital designs, and/or demonstrate how to use the customization functionalities. Details of user roles and interactions between the user are described later in reference to FIG. 2A.

2.2. Collaboration Data

Computer collaboration system 100 may include one or more databases 102-105 used to store information used to facilitate, conduct and save collaboration sessions. The types of the databases included in collaboration system 100 may vary and may depend on the implementation of platform 10. In the example depicted in FIG. 1, databases 102-105 include storage components configured to store, for example, attribution information, license information, restriction information, user profiles, global-key-values and other data used to track attributions of the contributors participating in customization sessions, as well as product definitions and other data used to generate a plurality of representations of customized products.

2.2.1. User Profiles

Computer collaboration system 100 may include one or more storage devices for storing user profiles database 102. User profiles database 102 may be used to store information indicating roles assigned to individual users, access codes or keys assigned to the users, identifiers and passwords assigned to the users, and the like. Examples of roles that may be assigned to the users were described above.

2.2.2. Product Definitions

Computer collaboration system 100 may further include one or more storage devices for storing product data definitions database 104. Product data definitions database 104 may include product descriptions of one or more interactive digital designs that are offered by computer collaboration system 100. A product description of an interactive digital design may include, for example, a global-key-values set, a set of attributes that are associated with the design, and default values that may be assigned to the attributes of the design.

2.2.3. Attribute Representations

Collaboration components 106 may include a component that is used to store a representation of attributes of an interactive digital design. The attributes may correspond to characteristics of the products and may be selected or provided by manufacturers of the products. The attributes may have assigned default values and the default values may be assigned either by the manufacturers, system administrators managing computer collaboration system 100 or platform 10, or artistic designers, as described earlier.

Descriptions of the attributes for each interactive digital design, or groups of designs, may be stored as part of collaboration components 106 or in a separate data structure that may be organized as a data table or storage space that is accessible to collaboration components 106. The descriptions of the attributes and values of the attributes associated with the products may be provided and/or requested by other components of computer collaboration system 100, such as a product options framework 110, which is described later.

For each interactive digital design available for customization using platform 10, default values of the attributes associated with the product may be modified by users according to the roles assigned to the users and according to the manufacturing constraints provided by a manufacturer. For example, if a customized product is a t-shirt, its default color may be red, but a user may modify the color by selecting any of three colors (e.g., red, green, or blue) to the tee-shirt. The modification may be stored in, for example, product data definitions 104.

An interactive digital design can be defined as the subset of the custom product attributes that may be altered, added, manufactured, or embellished for the purpose of custom product manufacturing. While the product attributes are product specific, they may include the substrate color or material choice for an area of the product, the trim material or color of a product, printed, engraved or embroidered embellishments, and/or color palettes applied to the design.

Attribute definitions and types, as well as default values for the attributes of an interactive digital design, may be provided by a manufacturer or a designer of the design. The attributes and default values may be changed by the users according to, for example, the roles assigned to the users. For example, a user who is assigned a role of an artistic designer may be allowed to edit/modify the attributes associated with the design, edit the default values of the attributes, as well as edit the ranges of the values that may be assigned to the attributes.

Suppose that an interactive digital design is a mug. Then an artistic designer may define several attributes for the mug and define default values for the attributes. The attributes may include a color, a size, a label, and an ornamental design imprinted on the mug. The default values for the attributes may include red for the color, large for the size, hello for the label, and white stripes for the ornamental design. The artistic designer may also define that a customer may modify the color of the mug by selecting either red or blue and may modify the size of the mug by selecting either large or small.

In some embodiments, a product description may include, or be associated with, a journaled list of modifications that have been submitted by users for an interactive digital design. The list may also include other information such as identifiers of the users who provided the modifications, global-key-values (note that the key is global the value is specific to this journaled list), generated as the collaborators collaborated on the customized product, a history log of the modifications that have been accepted, reverted, or deleted, comments that have been provided by the user, and the like. For example, one or more modifications stored in the list may be undone or redone by using a couple of clicks, not by performing countless clicks to undo or redo the customization as in conventional customization platforms.

The journaled list may also include global-key-values described in the next section.

2.2.4. Global-Key-Values

Computer collaboration system 100 may include one or more storage devices for storing global-key-values database 103. Global-key-values database 103 may store global-key-values sets that are used to track the contribution of each collaborator in a collaboration session, and to impartially establish copyrights and ownership for the customized product developed during the collaboration session.

All global-key-value pairs created and modified during a particular collaboration session are global in scope of that particular collaboration session. A global-key-value may correspond to a tuple, or a pair, that has a key and a value. While the key has a persistent meaning across all transactions, the value is scoped to a specific collaboration session. The key may indicate an attribute identifier/key, while the value may indicate a specific value for the key. For example, a global-key-value for an attribute called "owner" may include an "owner" as a key and a specific "user identifier" as a value. Detailed examples of global-key-values are described later.

For each customization project, at least one global-key-values set is generated. For example, when a customization project starts and a project owner initiates a collaboration customization session, collaboration system 100 may initiate global-key-values to indicate, for example, an identification of the owner, an identification of his license, and the like. Thus, the initial global-key-values set may include the following pairs: {Owner, user ID1}, {License, User ID1}. When the owner invites, for example, a designer to assist the owner with the customization, collaboration system 100 updates the set of global-key-values by adding an additional global-key-value pair to indicate, for example, an identification of the designer. Thus, the additional global-key-value pair may include: {Designer, user ID2}. When the owner decides to finish the collaboration customization session, collaboration system 100 may, for example, combine the relevant global-key-value pairs and initiate the processing of the pairs, as will be described later.

Examples of global-key-values may include constraints that specify rules and applicability of the rules to a product customization process, and transactions that specify entities and customization instructions for customizing the product. An example of a constraint global-key-value may include an age restriction constraint that prohibits individuals younger than 12 to customize the product. An example of a transaction global-key value may include a key-value pair that comprises customization instructions for a product customization. Details about the constraint global-key-values and transaction global-key-values are described later herein.

Figure 2A:
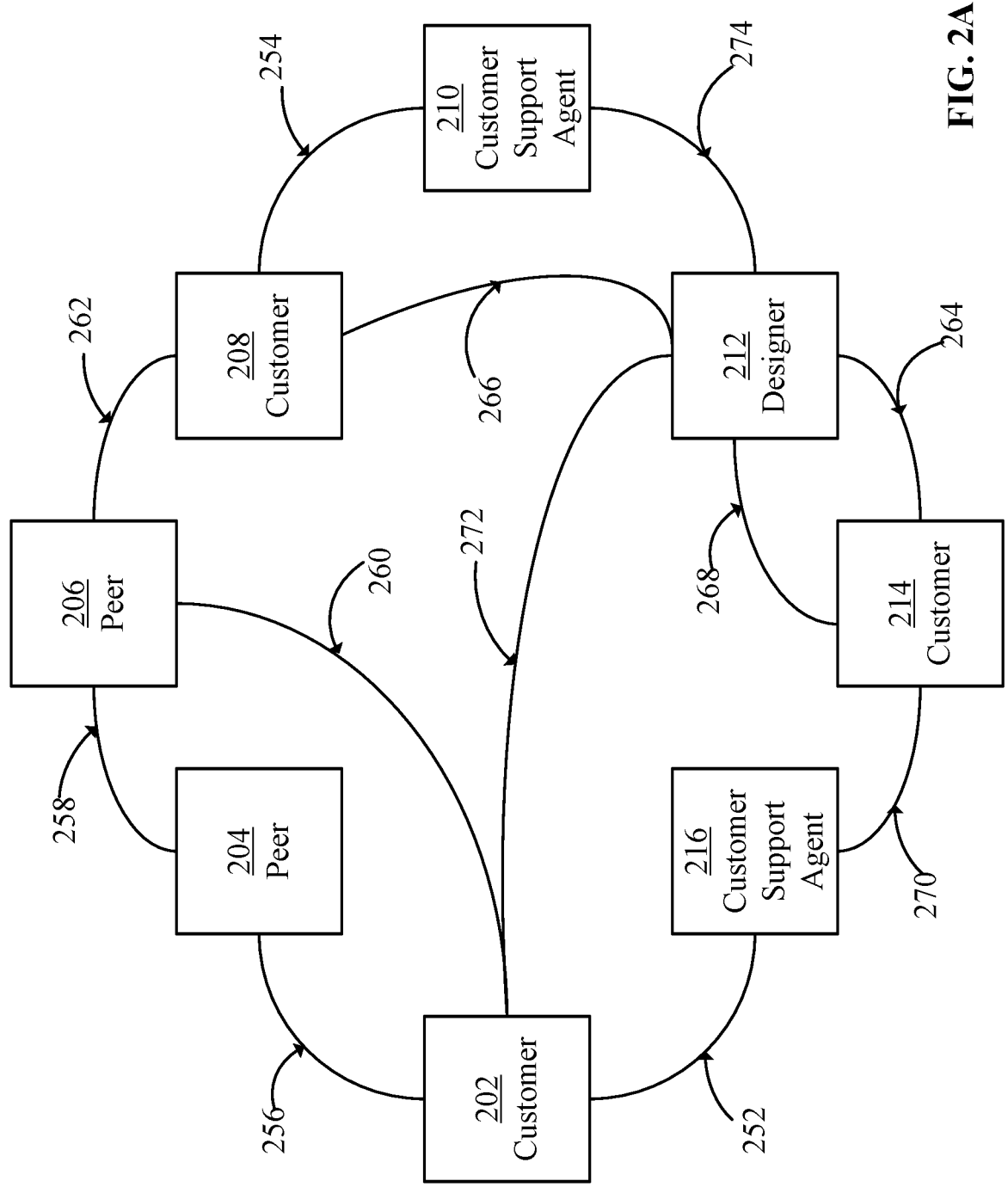
FIG. 2A is a block diagram showing collaboration examples.
Figure 2B:
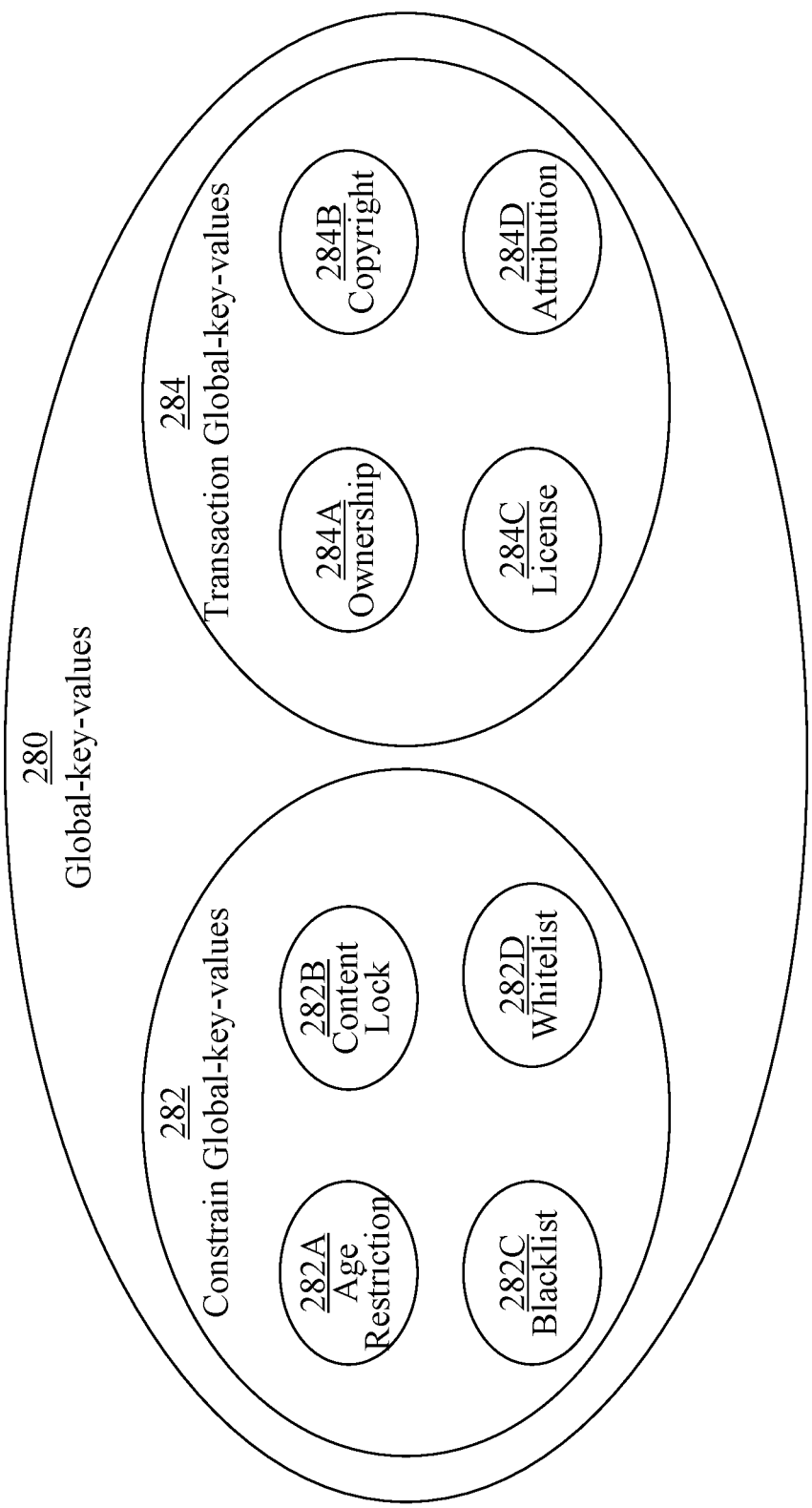
FIG. 2B is a block diagram showing examples of global-key-values.

FIG. 2B is a block diagram showing examples of global-key-values 280. In some embodiments, global-key-values 280 are used to specify certain rules that are to be applied to customized products and/or customization processes. In some embodiments, global-key-values 280 may be divided into two groups: constraints global-key-values 282 and transaction global-key-values 284. Constraint global-key-values 282 may be used to set forth constraints on the a customized product and/or a product customization process, while transaction global-key-values 284 may be used to capture the customization instructions set forth by the collaborators participating in a product customization process and used to derive manufacturing instructions for generating a customized product.

2.2.4.1. Constraints

In some embodiments, constraint global-key-values 282 may be specified by an owner, a designer, and the like, during a product customization session, and may be used to specify one or more constraints to be applied to a product customization process. The examples of constraint global-key-values 282 may include an age restriction constraint 282A which may be represented as a key-value pair {Age, 12}. Age restriction constraint 282A may, for example, indicate the minimum age of a customer who could purchase a custom product. Since certain products may be inappropriate for children, using a constraint global-key-value pair {Age, 12} may indicate that only customers who are at least 12 years old may purchase that product.

Another example of constraint global-key-value 282 is a content lock constraint 282B, which may specify that a key-value or set of key-values may not be modified. Content lock 282B may be a full lock, a partial lock, or a specific lock. For example, a user may specify that a first design is fully locked, while a second design is locked only if one attempts to modify a particular portion of the design (a partial lock or a specific lock).

Examples of constraint global-key-values 282 may also include a blacklist content restriction constraint 282C. This constraint may pertain to a list of content, such as imagery, text, color, or material composition. Blacklist constraint 282C may include a blacklist key "Blacklist," and one or more names, words, and the like, to form: {Blacklist, name1, word1, . . . }.

Additional examples of constraint global-key-values 282 may include a whitelist content restriction constraint 282D. This constraint may pertain to a list of content, such as imagery, text, color, or material composition, that may be used to modify a key-value, or a set of key-values in the saved data of a product description, which is described later, or when a key value journal is applied to a custom product. Whitelist constraint 282D may include a whitelist key "Whitelist," and one or more names, words, and the like, to form: {Whitelist, name1, word1, . . . } Additional details of constraint global-key-values are described later herein.

2.2.4.2. Transactions

In some embodiments, transaction global-key-values 284 are used to capture the customization instructions set forth by collaborators participating in product customization sessions. The transaction global-key-values 284 may be used to derive manufacturing instructions for generating a customized product. Transaction global-key-values 284 are probably the most often key-values used in collaboration platform 10, and therefore, for the brevity of the description, they are often referred to just as global-key-values 284.

A global-key-values set may comprise one or more key-value pairs, and each key-value pair may include a key and a value. Each new pair is added as another contributor contributes to the customization project. Examples of key-value pairs include an ownership key-value pair 284A that includes an ownership key and a user universally unique identifier (user ID); a copyright key-value pair 284B that includes a copyright key and a user ID; a license key-value pair 284C that includes a license key and a universally unique identifier for a specific license agreement held between an owner or a primary designer and a computer collaboration server; a customer support key-value pair (not shown) that includes a support key and a support agent contract identifier; and an attribution key-value 284D that includes an attribution key and a universally unique identifier that references a set of software instructions for manufacturing to apply a marking on the product as may be directed by copyright or licensing agreements. Additional details about the global-key-values are described later.

2.2.5. Attribution Trees

Referring again to FIG. 1, computer collaboration system 100 may further include one or more storage devices for storing an attribution tree database 105. Attribution tree database 105 may store ordered key-value pairs of global-key-values sets that are used to track contribution of each collaborator participating in a customization project. An attribution tree may be derived based on the global-key-value pairs generated during a collaboration project. It may be represented in a form of a tree structure, or any other structure, such as a table, and the like.

Figure 2C:
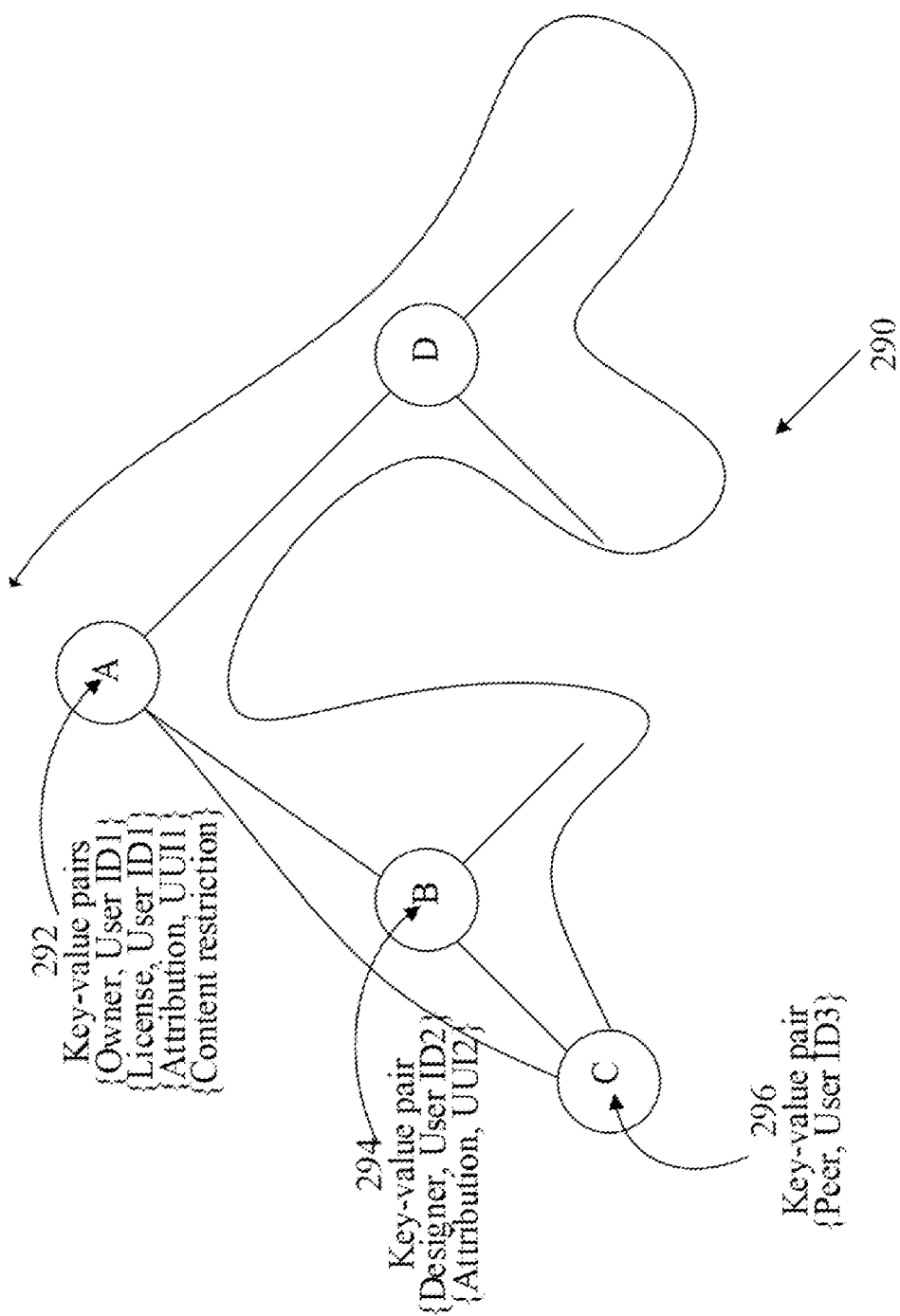
FIG. 2C is a block diagram showing an example attribution tree.

FIG. 2C is a block diagram showing an example attribution tree 290. Depicted attribution tree 290 is shown as a tree-based diagram; however, in other implementations, an attribution tree may be represented as a table, a mapping, or any other data structure configured to capture a sequence of global-key-value pairs generated during a product customization process.

In the depicted example, attribution tree 290 comprises four nodes: a node A, a node B, a node C and a node D. The node A is a starting node, and it corresponds to an owner node. The node B is connected to the node A and to the node C and is a designer node. The node C is connected to the node B and is a peer node. The node D is connected to the node A. In other examples, an attribution tree may include fewer or more nodes and their special relationship to each other may differ from the one shown in FIG. 2C.

Suppose that a global-key-values set for a customization project initiated by an owner included three key-value pairs, such as {Owner, user ID1}, {License, user ID1}, {Attribution, UUI1}, and {Content restriction}. The corresponding global-set-values for the node A are depicted in FIG. 2C as 292.

Suppose that the owner invited a designer to collaborate on the customization project. Hence, as the designer joined the customization project, other key-values set was added to the global-key-values set associated with the customization project. That key-values set of pairs may include {Designer, user ID2}, {Attribution, UUI2}. The corresponding global-set-values for the node B are depicted in FIG. 2C as 294.

Suppose that the designer invited a peer to collaborate on the customization project. Hence, as the peer joined the customization project, other key-values set was added to the global-key-values set associated with the customization project. That key-value pair may include {Peer, user ID3}. The corresponding global-set-values for the node C are depicted in FIG. 2C as 296.

Suppose that subsequently the customization project was finished. Thus, an example attribution tree, built from the global-key-values collected during the project may include the following pairs: for the node A: {Owner, user ID1}, {License, user ID}, {Attribution, UUI1}, {Content restriction}; for the node B: {Designer, user ID2}, {Attribution, UUI2}; and for the node C: {Peer, user ID3}.

The global-key-values set depicted in FIG. 2C may be used to track attributions of the collaborators participating in the customization session, and to generate manufacturing instructions for the customized product and licenses that are required to complete the project. The manufacturing instructions may be derived from UUI1 and UUI2, while the licenses may be derived from the {License, user ID1} pair. Additional details about attribution trees are described later herein. The license key-values affect the manufacturing of the product by directly affecting visibility or changes to the licensed content.

2.2.6. Collaboration Components

Referring again to FIG. 1, computer collaboration system 100 may include one or more software applications configured to implement collaboration components 106. Collaboration components 106 may include modules that are used to implement a role-based collaboration between users. The types of the modules included in collaboration components 106 may vary and may depend on the implementation of platform 10. In the example depicted in FIG. 1, collaboration components 106 include components configured to generate a plurality of representations. The examples of the representations are not shown in FIG. 1, but they are, however, described below.

2.2.6.1. User Interface Elements

Collaboration components 106 may include a component that is used to store a representation of user interface elements (not shown) that users may use to collaborate with each other and to customize interactive digital designs.

A user may modify values of attributes defined for an interactive digital design by using user interface elements presented and displayed for the user in a user interface. Examples of user interface may include a graphical user interface, a command-line interface, and the like. The user may use the user interface elements to customize/modify a style, color, size, label, ornamental design, surface qualities, material type, and the like of the interactive digital design. Furthermore, the user may customize individual portions of the customizable product or groups of portions of the customizable product.

The type and selection of user interface elements to be provided to a user may depend on a role assigned to the user. For example, if a user is a customer, then the user may edit his own interactive digital design, and thus he may be provided with a user interface that includes the interface elements that allow the user to edit and view the design, invite others to help the user in editing the design, invite others to view the design, and the like.

User interface elements may be specific not only to a role assigned to a user, but also to an interactive digital design itself. For example, if platform 10 offers customizable ties and customizable scarfs, and a user profile for a user includes information indicating that the user is a male, then it is assumed that the user might want to customize a tie, not a scarf. Furthermore, it may be assumed that the user would like to customize a color, a material and a shape of the tie. Based on that information, collaboration components 106 may select the user interface elements that are specific to the tie and to the selection of the tie attributes.

2.2.6.2. User Interface Elements for Design Areas

Collaboration components 106 may include a component that is used to store a representation of graphical user interface elements (not shown) associated with design areas of a customizable product. Design areas may include one or more areas defined within the customized product that a user may customize and/or modify. For example, if platform 10 offers customizable mugs, then design areas may include an area for showing an outside surface of the mug, an area for showing an inside surface of the mug, and an area for showing a surface of the mug handle. A product description for the design may specify that a user may modify the appearance of each of the surfaces separately, or that the user may group the surfaces and modify the group.

2.2.6.3. Customized Products

Collaboration components 106 may include a component that is used to store a representation of a finished customized product (not shown) as a fully rendered image. Rendering of the image may reflect the effect of sequentially applying all the modifications provided by users during a design collaboration. The representation of the finished customized product may include the rendering of the customized product as the product would appear after the customization process is completed.

2.2.6.4. Products During a Customization Phase

Collaboration components 106 may include a component that is used to store a representation of a product during a customization phase as a user customizes an interactive digital design. For example, if a user modifies the attributes associated with the design, the modifications may be translated into serialized customization actions and the corresponding serialized customization data may be stored in a journaled list of the modifications. The modifications may be used to render one or more representations of the design as the customization of the product progresses. The rendered representations may be displayed in a user interface generated for the user.

2.2.6.5. Representations of Product Views

Collaboration components 106 may include a component that is used to store one or more representations of one or more views of an interactive digital design as the design is updated by users. The views may also include specific views of the product attribute group or groups that are filtered according to a task that the user is performing and/or according to a role that is assigned to the user.

2.3. Product Options Framework

In some embodiments, product options framework 110 comprises a plurality of modules and applications which, when executed by one or more processors 120, cause the processors to implement the method for role-based and attribution-tracking collaborative design of custom products. Product options framework 110 may be configured to communicate with an attribution framework 129, a rendering framework 130, an accessories framework 132, a bundling framework 134, and a defaulting framework 136.

Attribution framework 129 may be configured to, for example, generate an attribution tree, as the tree shown in FIG. 2C, based on global-key-values collected during a customization session. Attribution framework 129 may also be configured to use the attribution tree to determine and verify corresponding licenses and copyright privileges for users/collaborators who participated in the customization session. Furthermore, attribution framework 129 may be configured to track the contributions of the collaborators and to derive the manufacturing instructions from the global-key-values collected during the session.

Product options framework 110 may be configured to receive inputs from rendering framework 130 to generate a rendering of an interactive digital design based on, at least in part, a current representation stored in collaboration components 106. Product options framework 110 may be also configured to receive inputs from accessories framework 132 to determine one or more accessories for an interactive digital design, and to include the determined accessories in the customization of the product.

Furthermore, product options framework 110 may be configured to receive inputs from building framework 134 to determine constraints for customizing an interactive digital design. This may include determining one or more attributes that are associated with the design and that can be customized by users. This may also include assigning default values to the determined attributes, determining ranges of values for the attributes, and/or determining sets of values that may be assigned to the attributes.

Product options framework 110 may be also configured to receive inputs from defaulting framework 116 to determine a default design for an interactive digital design, determine default roles that may be assigned to the user, and determine initial values for various parameters and attributes associated with the designs and collaboration sessions.

2.4. Attribute Engines

Attribute engine 108 may be configured to facilitate role-based collaboration of customizable products according to roles assigned to users and according to manufacturing constraints set forth for the products.

Attribute engine 108 may be configured to, for example, interact with collaboration components 106, product options framework 110, frameworks 130-136 and user devices 140A-140D to allow the users using devices 140A-140D to collaborate in customizing interactive digital designs offered by platform 10.

In some embodiments, attribute engine 108 may be configured to interact directly with users of user devices 140A-140D. In other embodiments, attribute engine 108 may be configured to interact with users of user devices 140A-140D via a computer network 130, as shown in FIG. 1.

Computer network 130 may be implemented as any type of communications network, including a local area network (LAN), wide area network (WAN), a wireless network, a secure virtual LAN (vLAN), a secure virtual WAN (vWAN), and the like.

2.5. User Devices

User devices 140A-140G may include any type of communications devices configured to facilitate communications between users and computer collaboration system 100. In the example depicted in FIG. 1, a user device 140A is a laptop, a user device 140B is a personal computer, a user device 140C is a personal assistant device, a user device 140D is a mobile device such as a smartphone, a user device 140E is a video camera, a user device 140F is a digital camera, and a user device 140G is a microphone configured to capture audio data and communicate the audio data to computer collaboration system 100.

The types and counts of user devices 140A-140G are not limited to the examples shown in FIG. 1. For example, even though FIG. 1 depicts only one laptop 140A, one personal computer 140B, one personal assistant 140C, one smartphone 140D, one video camera 140E, one digital camera 140F, and one microphone 140G, platform 10 may include a plurality of laptops 140A, a plurality of personal computers 140B, a plurality of personal assistants 140C, a plurality of smartphones 140D, a plurality of video cameras 140E, a plurality of digital cameras 140F, and a plurality of microphones 140G. In other examples, user devices may include fewer devices than those depicted in FIG. 1. In yet other examples, the user devices may include devices that are not depicted in FIG. 1.

2.6. Collaboration Server

Collaboration server 155 may be implemented in software, hardware, or both, and may be configured to cooperate with monitoring system 156 to provide monitoring capabilities to operators of the platform and/or a third-party monitoring service. The capabilities may include the ability to intercept contents of communications exchanged between the users of the collaboration platform, determine whether the communications meet the terms of the collaboration agreements, and pursue actions to address violations when the communications fail to meet the rules set forth in the agreements.

Collaboration server 155 may be part of computer collaboration system 100, as shown in FIG. 1. Alternatively, a collaboration server may be a system implemented in a computer server (not shown) that is separate from computer collaboration system 100.

In some embodiments, collaboration server 155 may comprise request analyzer 159, as shown in FIG. 1. In other embodiments, collaboration server 155 may be separate from request analyzer 159.

In some embodiments, collaboration system 155 may receive a request for ordering, for example, a physical product corresponding to an interactive digital design. Collaboration system 155 may collaborate with code embedder 158 to generate a token (or to retrieve the already generated token) that represents a plurality of key-value pairs for the interactive design. The token may contain digital data that encodes a UUID of a plurality of key-value pairs for the interactive design. In some embodiments, the plurality of key-value pairs may be saved in a separate file, and a hyperlink to the file may be stored and referred to by the token, by the hyperlink's identifier, or by a URL.

Collaboration system 155, product option framework 110, attribute engine 108, request analyzer 159 and code embedder 158 may cooperate with each other to generate a digital representation of the interactive design and to embed the token in the digital representation. Code embedder 158 may embed the token indicating the set of the key-value pairs into the digital representation of the interactive design.

In some embodiments, collaboration server 155 is configured to transform ownership and license agreements, embedded in a plurality of key-value pairs journaled during a collaboration session between collaborators, into a graph-network and then into an ownership-agreement tree. The ownership-agreement tree may be used to represent the ownership and license agreements between the collaborators participating in the collaboration session.

Collaboration server 155 may be also configured to evaluate the ownership-agreement tree with respect to a plurality of role-based communications channels, established between the collaborators, for each constraint of a plurality of constraints on each collaborator of the collaborators.

The constraints may be identified from the ownership-agreement tree, and may include rules, guidance, conditions, specifications, and provisions that set forth the manner in which collaborators may communicate with each other during collaboration sessions. Examples of constraints may include agreement constraints (such as ownership agreements, license agreements, and the like), use constraints (that impose limits on editing and modifying design elements produced by collaborators), communications constraints (that impose limits to durations of the sessions, inactivity during the sessions, and the like), interactions constraints (such as contractual constraints and professional-conduct constraints), and content constraints (imposing blacklists and whitelists on the communications). Some of the constraints may be system-wide constraints and apply to one or more, or all, collaborations supported by a collaboration platform.

In some embodiments, collaboration server 155 may be configured to determine whether one or more communications, exchanged by the collaborators via the plurality of role-based communications channels, violate one or more constraints of the plurality of constraints.

In response to determining that some communications violate the constraints, collaboration server 155 may determine one or more triggers corresponding to violations, and based on the triggers, determine one or more actions to be performed to address the violations. Subsequently, collaboration server 155 may send the actions, or the identifiers of the actions, to, for example, monitoring system 156 to cause the monitoring system to execute the actions to address the violations.

To enable the above described process, collaboration server 155 cooperates with monitoring system 156 also with respect to handling the receiving live-requests issued by users to initiate collaboration sessions with other users, designers, support engineers, and the like.

Furthermore, collaboration server 155 may be configured to monitor requests issued by the users who request assistance from designers and/or support engineers, and to monitor live video-based sessions, live-audio sessions, and/or live chats established in response to the requests. To monitor the sessions and chats, collaboration server 155 may use monitoring system 156, agreement processor 152, and/or communications processor 153 to intercept the communications included in the sessions, generate transcripts of the sessions, and the like.

In some embodiments, a transcript includes video frames, audio clips and chat texts. The transcripts may be used for training purposes, and to monitor the communications exchanged between the users, customers, designers, support engineers and others who participate in the collaboration sessions supported by the collaboration platform.

In some embodiments, upon receiving a transcript, collaboration server 155 uses monitoring system 156 and/or processor 120 to determine, based on the transcript, individual communications of the corresponding data streams and use, for example, monitoring system 156 to determine whether the communications indicate violations. This may be determined by referring to, for example, blacklist database 163, which may include a blacklist of words and phrases determined to be inappropriate, unprofessional and/or undesirable.

Blacklist database 163 may also include a whitelist of words and phrases that collaborators may use when communicating with each other.

Upon receiving an indication that some communications trigger a violation of the terms of agreement between the collaborators, collaboration server 155 may use monitoring system 156 to determine actions to address the violation.

In some embodiments, an action may be determined using contents of actions database 162 or any other database configured to provide a mapping between violation triggers and the actions.

Action database 162 may be a database implemented separately from blacklist database 163, as shown in FIG. 1. Alternatively, an action database may be combined with blacklist database 163, and both databases may implement a mapping from the characteristics indicating violations to the actions.

Generally, the actions may include removing the collaborator(s), terminating the session(s), generating, and sending notifications to the corresponding users, generating, and sending notifications to the management managing the designers and support engineers, and the like. If communications include inappropriate words/language exchanged during a corresponding communications session, then the actions may include, for example, terminating the communications session, removing a collaborator, sending a warning message to the corresponding collaborator, and the like. On the other hand, if communications indicate a long time of inactivity during the communications session, the actions may include aborting the session, notifying the system administrator about the no-show, notifying the users that the session has been aborted, and the like.

2.7. Monitoring System

In some embodiments, monitoring system 156 is implemented as a component of collaboration server 155, as shown in FIG. 1. In other embodiments, monitoring system 156 is implemented as a server (not shown) separate from collaboration server 155.

Monitoring system 156 may be configured to cooperate with collaboration server 155 in terms of tracking and monitoring the communications exchanged between collaborators, generating transcripts of the communications, and parsing the transcripts to determine characteristics of the corresponding data streams.

Monitoring system 156 may also be configured to assist collaboration server 155 in evaluating an ownership-agreement tree with respect to role-based communications channels, established between the collaborators, to determine whether any communications exchanged between the collaborators violate any constraints of a plurality of constraints.

Monitoring system 156 may also assist collaboration server 155 in determining triggers corresponding to violations of the constraints and determining actions to be performed to address the violations. Furthermore, monitoring system 156 may be configured to determine actions for addressing the violations of the constraints. This may include using a lookup table (implemented in blacklist database 163, actions database 162, or both) that includes mappings between triggers corresponding to violations and the corresponding actions. For example, if a trigger indicates the usage of inappropriate words/language during a corresponding communications session, then the action may include terminating the communications session, removing the collaborator who used the inappropriate language, and/or sending a warning message to the collaborators.

In some embodiments, monitoring system 156 is configured to initiate execution of the selected action. To perform this, monitoring system 156 may collaborate with collaboration server 155, and/or any other component of computer collaboration system 100 configured to perform the actions.

2.8. Processors

In some embodiments, computer collaboration system 100 comprises agreement processor 152, communications processor 153, processor 120, and/or monitoring system 156. Among other things, components 152-153, 120 and 156 are configured to support collaboration server 155 in journaling key-value pairs that capture ownership and license agreements. They may also be configured to support transforming the key-value pairs into a graph-network and then into an ownership-agreement tree.

Components 152-153, 120 and 156 may also be configured to support collaboration server 155 in evaluating the ownership-agreement tree with respect to a plurality of role-based communications channels, established between the collaborators, for each constraints on each collaborator.

Moreover, components 152-153, 120 and 156 may support collaboration server 155 in determining whether one or more communications, monitored in the plurality of role-based communications channels, violate one or more constraints of the plurality of constraints.

That determination may include, among other things, generating transcripts of data intercepted from data communications channels supporting communications sessions established between collaborators. For example, components 152-153, 156 and 120 may generate a video transcript of the video chat and associate the transcript with the corresponding collaboration session. Components 152-153, 120 and 156 may provide the content of the transcript, including video frames, audio clips and chat texts, to monitoring system 156 and/or collaboration server 155.

Components 152-153, 120 and 156 may also be configured to collect statistical and diagnostic information about communications sessions established to support collaboration between users. For a communications session, the information may include information about the duration of the session, a count of retransmissions performed during the session, an indication of whether the session ended abruptly, and the like.

3. Digital Product Tokens Representing Digital Designs 3.1. Tokens

In some embodiments, a digital product token functions as a representation of a custom digital product and/or a physical product. A token may be also referred to as a DigitalProductToken. Functionalities of the DigitalProductToken may be captured in a plurality of global key-value pairs that are journaled during an interactive session when an interactive digital design is created. The global key-value pairs journaled for the interactive digital design are referred to as a journaled global key-value pairs. The global key-value pairs comprise associations between the attribute keys and the values of the corresponding keys. The global key-value pairs include global keys (available to many collaboration sessions), but values that are specific to the particular collaboration session.

Figure 2D:
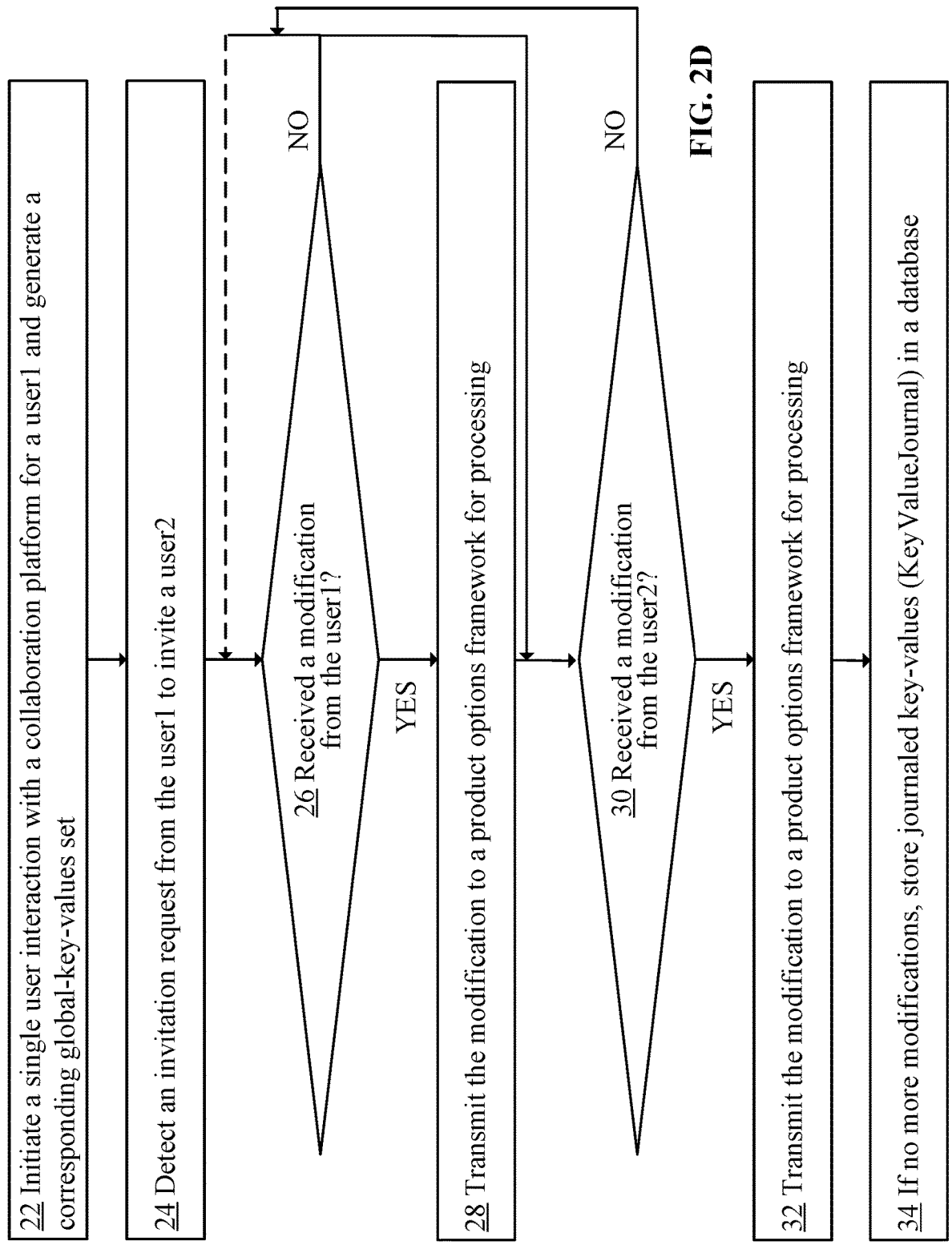
FIG. 2D is a flow diagram showing an example process implementing role-based collaboration and attribution-tracking.
Figure 2E:
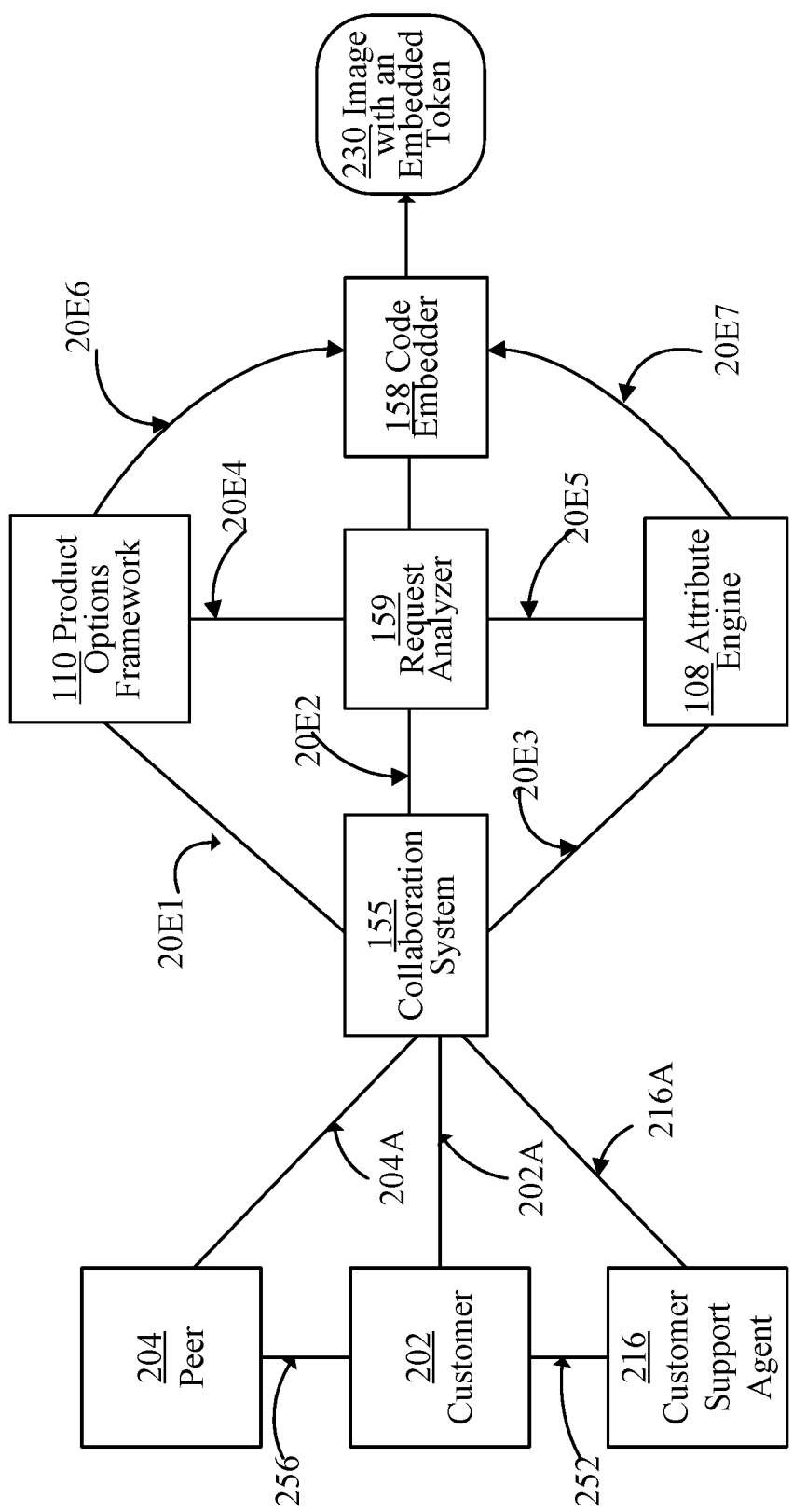
FIG. 2E is a block diagram showing using tokens to represent digital designs and physical products.

FIG. 2E is a block diagram showing using tokens to represent digital designs and physical products. In the depicted example, customer 202 collaborates with peer 204 and customer support agent 216. The roles of individuals 202, 204 and 216 and the different ways of collaborating are described in detail in FIG. 2A. In other examples, customer 202 may contemporaneously collaborate with several peers, several support agents, and/or several designers.

In FIG. 2E, customer 202 communicates with peer 204 via a communications session established along link 256 and communicates with customer support agent 216 via a communications session established along link 252.

In some embodiments, collaboration system 155 receives (element 202A) modifications implemented and accepted by customer 202, receives (element 204A) modifications implemented and accepted by peer 204, and receives (element 216A) modifications implemented and accepted by customer support agent 216.

Collaboration system 155 may cooperate with product options framework 110 and transmit (20E1) data to product options framework 110. Collaboration system 155 may also collaborate with attribute engine 108 and transmit (20E3) data to collaboration system 155.

Furthermore, collaboration system 155 may cooperate with request analyzer 159 and transmit (20E2) a request for, for example, corresponding physical product and/or digital designs, to request analyzer 159.

In some embodiments, request analyzer 159 may request and receive (20E4) the data from product options framework 110. Furthermore, request analyzer 159 may request and receive (20E5) the data from attribute engine 108.

Collaboration system 155, product option framework 110, attribute engine 108 and request analyzer 159 may cooperate with each other. This may include journaling a plurality of key-value pairs generated during the interactive session during which peer 204, customer 202 and customer support agent 216 create the interactive digital design. This may also include transforming ownership and license agreements, embedded in the plurality of key-value pairs journaled during a collaboration session, into a graph-network and then into an ownership-agreement tree. This may also include evaluating the ownership-agreement tree with respect to communications channels 256 and 252, established between customer 202, peer 204 and customer support agent 216, respectively to determine whether any communications between any users 202, 204 and 216 violated any constraints included in the ownership-agreement tree.

Collaboration system 155, product option framework 110, attribute engine 108 and request analyzer 159 may also cooperate with each other when a request for ordering, for example, a physical product corresponding to the interactive digital design is received. In response to receiving the request, collaboration system 155, product option framework 110, attribute engine 108 and request analyzer 159 may collaborate to determine, or retrieve, a token that represents a plurality of key-value pairs for the interactive design.

3.2. Generating and Embedding Tokens

In some embodiments, in response to receiving a request for ordering, for example, a physical product corresponding to the interactive digital design, product options framework 110 may generate product description data for the interactive design, and code embedder 158 may generate a token that represents (or indicates) a plurality of key-value pairs for the interactive design. The token may be represented by, for example, a UUID that identifies the plurality of key-value pairs, or a URL that points to a location at which data that encodes the plurality of key-value pairs for the interactive design is stored. Alternatively, the token itself may represent the plurality of key-value pairs for the interactive design.

In some embodiments, the token may be embedded in the product description data as a watermark. In other embodiments, the token itself may be saved in a separate file, and a hyperlink to the file may be stored and referred to by the hyperlink's identifier or a URL.

Collaboration system 155, product option framework 110, attribute engine 108, request analyzer 159 and code embedder 158 may cooperate with each other to generate a digital representation of the interactive design and to embed the token in the digital representation. For example, code embedder 158 may receive (element 20E6) the product description data for the interactive design from product option framework 110 and may receive (element 20E7) from attribute engine 108 the data comprising the plurality of key-value pairs generated for the interactive design. Upon receiving the product description data for the digital representation of the interactive design and upon receiving the plurality of key-value pairs for the interactive design, code embedder 158 may generate the token to represent (or indicate) the plurality of key-value pairs, and embed the token representing the e key-value pairs into the digital representation of the interactive design. Then code embedder 158 may embed the token in, for example, an image 230.

A token may be associated with a graphical representation of an image using several approaches. In some embodiments, the token may be represented as a watermark in the product description data. The token may be represented as a UUID that uniquely identifies the plurality of the key-value pairs, i.e., it may correspond to the KeyValueJournal's UUID. In some implementations, the UUID may be encoded using 32 characters.

A UUID may be embedded in product description data of an interactive design as a watermark in, for example, a frequency domain data of the description data. According to another example, the UUID may be included in the description data as comment data. The comment data, however, could potentially be removed from the description data, and thus the UUID could be lost. Therefore, including the UUID in, for example, the frequency domain data of the description data of the interactive design is a safer way of embedding the UUID in the data.

The embedding may also include combining the watermarked digital representation with a file that is hyperlinked by the watermark and that comprises a corresponding plurality of key-value pairs for the interactive design.

In some embodiments, a plurality of key-value pairs is provided to a DigitalProductToken manufacturing system to cause the manufacturing system to output many different styles of DigitalProductTokens. Each style of digital product may contain the embedded KeyValueJournal's UUID as metadata and as a digital watermark.

3.3. Using Tokens

In some embodiments, a manufacturing system is built to accept a KeyValueJournal generated during a design session during which an interactive digital design was created. Typically, the KeyValueJournal corresponds to a plurality of key-value pairs. The manufacturing system may also be configured to accept additional key-values that can be used to modify the output generated by the manufacturing system.

Suppose that a designer (or any other collaborator) used the capabilities of a collaboration platform to create a custom digital representation of a custom product. A plurality of key-value pairs may be captured using a DigitalProductToken (i.e., a token). The DigitalProductToken may be used to capture the attributes and the attributes' values of the custom product and may be used to further customize the product. Furthermore, the DigitalProductToken may be used to provide a means to order and purchase a custom physical product corresponding to the custom digital representation.

For example, a DigitalProductToken may be communicated to a manufacturing entity to cause the manufacturing entity to use the DigitalProductToken to retrieve a plurality of key-value pairs and use them to generate a custom digital presentation. Furthermore, the manufacturing entity may use the DigitalProductToken to retrieve a plurality of key-value pairs and use them to generate manufacturing instructions for manufacturing a custom physical product.

If a designer decides to modify the custom digital presentation, then a product options framework is invoked to generate and display a user interface configured to modify the custom digital presentation from its product description and to present it to the designer. For example, if the designer decides to change a color choice attribute using the functionalities of the user interface, then one of more key-value pairs of the plurality of key-value pairs for the product description of the custom digital presentation are updated and stored.

Later, the designer may receive a modified custom digital presentation and may review it in the user interface. If the designer accepts the modified custom design, then a DigitalProductToken for the digital representation may be created to indicate, or capture, the plurality of the key-value pairs for the modified custom design. The DigitalProductToken may be embedded in product description data generated for the modified digital design. The product description data with the embedded DigitalProductToken may be stored in a storage device. The DigitalProductToken may be a UUID identifying the plurality of key-value pairs. Furthermore, a secure uniform resource identifier (URI) may be created and sent to the designer to indicate to the designer the location where the digital representation of the design is stored in in a website operated by, for example, a collaboration platform.

3.4. Extracting and Using Tokens

If a user views the custom digital representation and selects it, then the selection may cause the user's browser to invoke a custom digital representation service to inquire about a physical product corresponding to the digital design. Then, the service may extract the UUID of the DigitalProductToken from product description data for the digital design and use the UUID to retrieve a corresponding plurality of key-value pairs that represents a full description of the custom product.

If the designer decides to submit the digital product for a manufacturing entity, then the product description with the embedded DigitalProductToken (indicating a plurality of key-value pairs) may be sent to the manufacturing entity. The embedded DigitalProductToken indicates (or captures) the plurality of key-value pairs (i.e., the KeyValueJournal). Subsequently, the designer (or a user) may order a custom product (digital or physical), and in response thereto, the manufacturing entity may use the DigitalProductToken to retrieve the plurality of key-value pairs and use the pairs to generate manufacturing instructions for manufacturing the product.

Furthermore, in response to ordering the product, the manufacturing entity (or a collaboration platform) may determine the forms of ownership and licenses that are recorded in the KeyValueJournal that was used to create the custom product. Based on the KeyValueJournal, the system may determine how and in what form the designer is to be compensated for his/her ownership of the design recorded in the KeyValueJournal.

Manufacturing of the product may be based on the manufacturing instructions generated from the KeyValueJournal and captured in the plurality of key-value pairs. Once the product is manufactured, if the product is a digital product, then the digital product may be digitally delivered to the users. However, if the product is a physical product, then the physical product may be physically shipped to the users.

4. Using Digital Product Tokens to Obtain Digital and Physical Products

4.1. Manufacturing Process

As described above, a manufacturing process may pertain to manufacturing a digital product as well as manufacturing a physical product of an interactive product. Since the manufacturing instructions for generating a digital product are generated based on a plurality of key-value pairs for the interactive product, in some situations, the same manufacturing instructions may be used to "manufacture" the digital product as well as to manufacture the physical product.

In some embodiments, a product options framework may build an interface for a key called OutputStyle. The interface for the OutputStyle key may allow a designer (or any other collaborator) to select values for the media for the presentation of an interactive design. The choices may include a JPEG_Image, GIFF_Image, and H264_Video.

In some embodiments, if a designer chooses the GIFF_Image option, then the product options framework may send the instructions to the manufacturing system to traverse each of the key-values in the KeyValueJournal, and for each key, and use a User Product Renderer to render the state of the custom physical product with that modification as images in the sRGB 32-bit RGBA format.

Subsequently, the manufacturing system may store the renderings in a local image cache.

Then, the manufacturing system may traverse the images stored in the local image cache and determine an optimal color palette for that collection of images.

Subsequently, the manufacturing system may convert the images in the local image cache from 32-bit RGBA format to 8 bit Indexed color.

Then, the manufacturing system may embed a digital watermark which encodes the input KeyValueJournal's UUID in the 8 bit indexed color image cache.

Next, the manufacturing system may begin encoding the image file. For example, the manufacturing system may write the header bytes; write the Logical Screen Descriptor bytes; write the found color palette as a gif Global Color Table; write the gif 8 bit character application name; and embed metadata as a comment (or a watermark) which encodes the input KeyValueJournal's UUID.

Next, the manufacturing system sets a FrameCount to 1 and proceeds to processing each frame in the image file. The processing includes: if there is an image in the 8 bit indexed color image cache, then the manufacturing system continues; otherwise, the manufacturing system proceeds to taking the next image.

To continue, the manufacturing system writes the gif Graphic Control Description for the FrameCount, and then processes the first 8 bit indexed color image cache into blocks of 255 LZW compressed bytes.

Next, the manufacturing system writes the compressed bytes, and removes the first image from the 8 bit indexed color image cache. Then, the manufacturing system increments the FrameCount and repeats the process for the next frame.

Once the manufacturing system processes all frames, the manufacturing system writes the file terminator (such as an ASCII code for zero) to the image file and outputs the manufactured GIF product.

At this point, the manufacturing instructions for manufacturing the product are complete.

4.2. Using Tokens to Request Products

A user (or any other collaborator), who has completed a collaboration session and created an interactive design, may use a captured KeyValueJournal to create a presentation or demonstration of the created design. The designer may browse the different forms of presentations that may be construed from the KeyValueJournal of the design. A graphical representation of the interactive design may be generated by a product option framework and based on a plurality of key-value pairs captured in the KeyValueJournal.

The product options framework may generate an interface and present the graphical representation of the custom product in the interface. The framework may also generate an interface for other key-value pairs that may apply to the custom digital presentation.

In some embodiments, a user may request digital products and/or physical products corresponding to the interactive designs created by the user and his/her peers.

Figure 6:
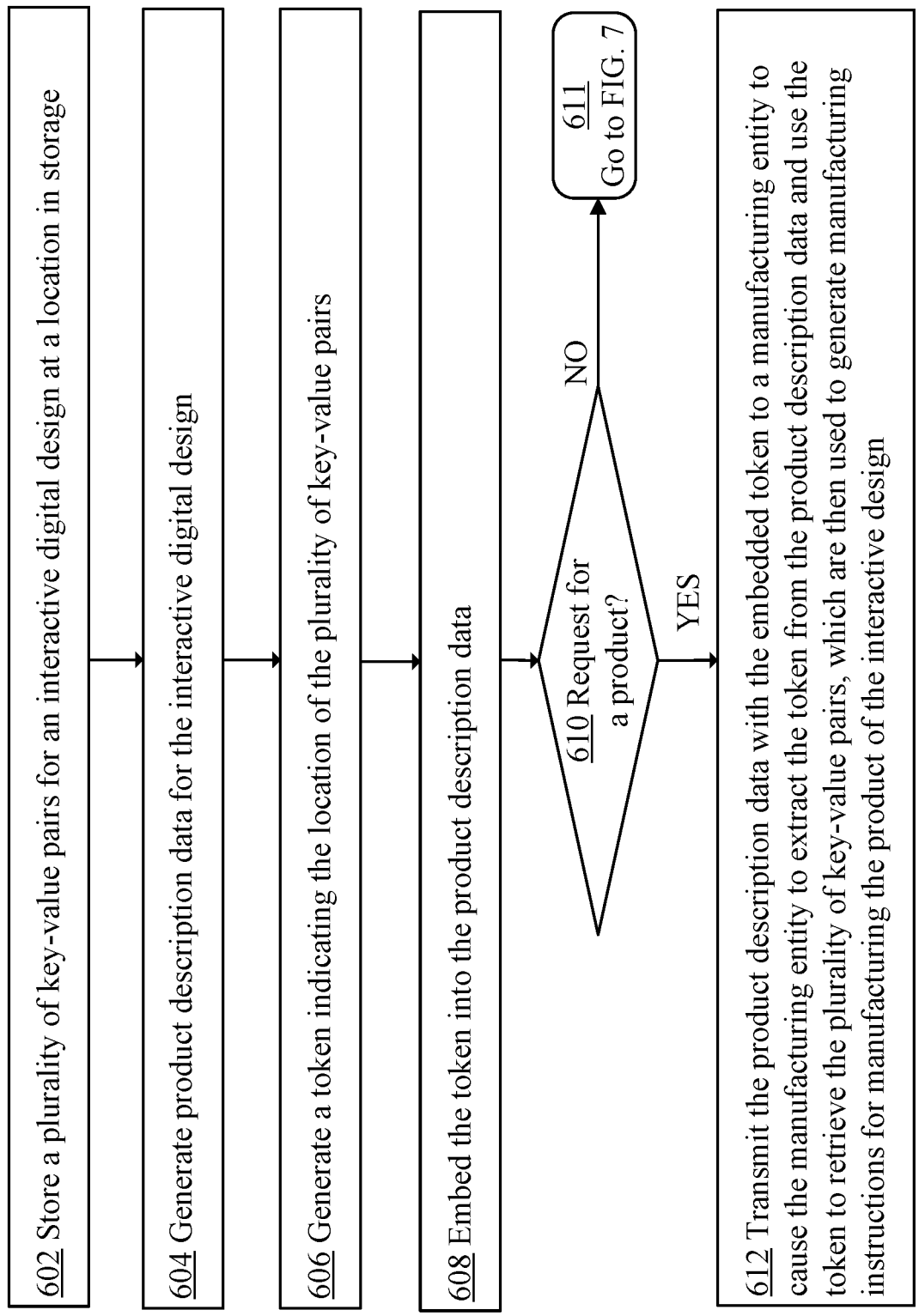
FIG. 6 is a flow diagram showing an example process implementing using tokens to request digital and physical products.

FIG. 6 is a flow diagram showing an example process implementing using tokens to request digital and physical products. The process depicted in FIG. 6 may be performed by a computer collaboration server or any application executing on a collaboration platform or a server.

In step 602, a computer collaboration server stores a plurality of key-value pairs associated with an interactive digital design at a location in storage. The plurality of key-value pairs may be stored in a storage unit maintained by the collaboration server, a cloud system, or any other platform available to the collaboration server. The pairs may include a plurality of product attributes and corresponding values for the interactive digital design.

In step 604, the collaboration server generates, based on, at least in part, the plurality of key-value pairs, product description data for the interactive digital design. The product description data for the interactive digital design may include data for generating a graphical visual representation of the interactive product that is capable of custom manufacture. The product description data may comprise a plurality of global-key-value pairs journaled within the product description data as the interactive digital design is customized by users, designers, and support engineers.

In step 606, the collaboration server generates a digital product token capturing the plurality of key-value pairs. The token may indicate the location at which the plurality of key-value pairs is stored.

The digital token is digital information that references in some way the plurality of key-value pairs that has been journaled during an interactive process of creating the interactive design. The digital token may be represented as, for example a UUID that uniquely identifies the location at which the plurality of key-value pairs for an interactive design has been stored. The token may also be a URL pointing to the location at which the plurality of key-value pairs has been stored.

In step 608, the collaboration server embeds the token into the product description of the interactive digital design. The token may be embedded in the product description data as, for example, a watermark. There are many ways of embedding the token as a watermark in a data file. According to one approach, the token may be embedded in the product description data in a frequency domain data of the product description data.

Also, in this step, the collaboration server may transmit the graphical representation of the interactive digital design to a computer device to cause a computer device to display the graphical representation on a display of the computer device.

In step 610, the collaboration server determines whether the collaboration server received a request for a product corresponding to the interactive digital design. If the request has been received, then the collaboration server proceeds to performing step 612; otherwise, the collaboration server proceeds to performing step 611, which is described in FIG. 7.

In step 612, the collaboration server transmits the product description data with the embedded token to, for example, a manufacturing entity, to cause the manufacturing entity to extract the token from the product description data and use the token to retrieve the plurality of key-value pairs from the location at which the pairs are stored. Once the pairs are retrieved, the manufacturing entity uses the pairs to generate manufacturing instructions for manufacturing the product corresponding to the interactive design.

4.3. Using Tokens to Facilitate Modifications

Figure 7:
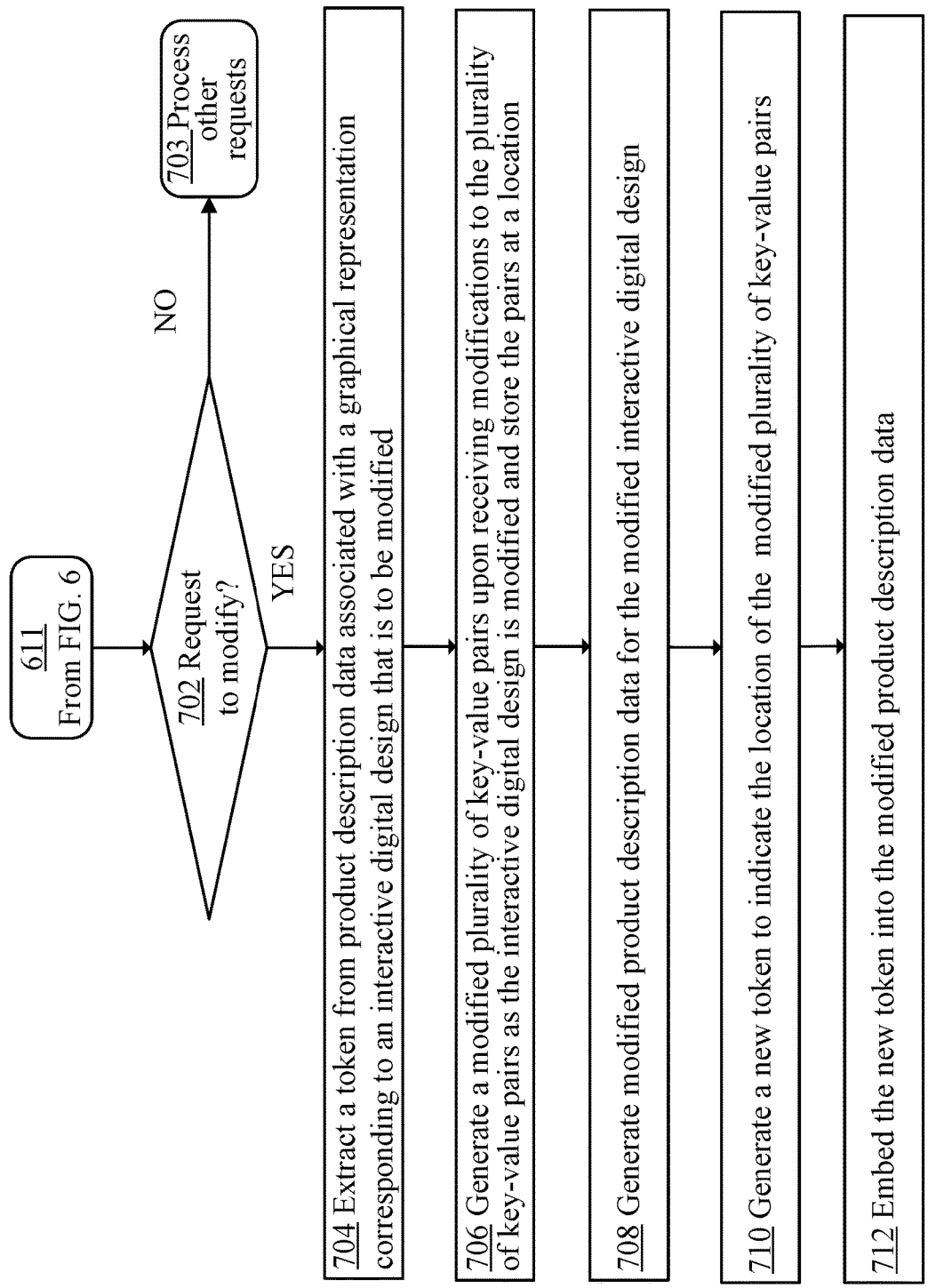
FIG. 7 is a flow diagram showing an example process implementing using tokens to facilitate modifications of digital designs.

FIG. 7 is a flow diagram showing an example process implementing using tokens to facilitate modifications of digital designs. The flow starts from step 611 described in FIG. 6.

In step 702, a computer collaboration server determines whether a request to modify an interactive digital design has been received. The request may be received from a user who developed the interactive design and/or from peers or designers who collaborate in developing the interactive design.

If the request is received, then the computer collaboration server proceeds to perform step 704; otherwise, the computer collaboration server proceeds to step 703 to process other requests.

In step 704, the computer collaboration server extracts a particular token from product description data associated with a graphical representation corresponding to the interactive design that is to be modified. As described before, the token may be embedded in the product description data and may indicate a location of a plurality of key-value pairs associated with the interactive digital design. The plurality of key-value pairs may comprise a plurality of product attributes and corresponding values for the interactive digital design. Also, in this step, the collaboration server retrieves the plurality of key-value pairs for the interactive design.

In step 706, the collaboration server generates a modified plurality of key-value pairs upon receiving modifications to the plurality of key-value pairs as the interactive digital design is modified. Once the modification of the interactive design is finished, the collaboration server generates, in step 708, a modified graphical representation of the modified interactive design. The modified graphical representation may be displayed for the user on a display device of the user's computer. Also, in this step, the collaboration server generates, based on the modified plurality of key-value pairs, modified product description data for the modified interactive digital design. Furthermore, the modified pair of the key-value pairs is stored at a location in a storage unit or a cloud system available to the collaboration server.

In step 710, the collaboration server generates a new token to indicate the modified plurality of key-value pairs. The token may indicate the location at which the modified plurality of the key-value pairs is stored. Alternatively, the token may digitally represent the modified plurality of the key-value pairs.

In step 712, the collaboration server embeds the new token into the modified product description data. The token may be embedded as a watermark included in the frequency domain of the modified product description data for the modified interactive design.

Once the token is embedded in the modified product description data for the modified interactive product, the modified product description data may be stored.

4.4. Using Tokens to Retrieve Digital Designs

In some embodiments, tokens are used to retrieve digital designs. For example, if a user requests displaying the modified interactive design, then the modified product description data, having the embedded token, may be retrieved from the storage. To do that, the token may be extracted from the product description data and used to retrieve the modified plurality of key-value pairs from a particular location on the storage.

The modified plurality of key-value pairs may be used to generate a modified representation of the modified interactive design. Then, the modified plurality of key-value pairs may be used to manufacture a digital product and/or a physical product of the modified interactive digital design.

Generally, tokens may be used to retrieve a plurality of key-value pairs, which in turn may be used to generate graphical representations or digital designs. Furthermore, the pairs may be used to generate manufacturing instructions to produce, by a manufacturing system, custom digital presentations of digital design, and provide the custom digital presentations to users and designers who can view the custom digital presentations and review them.

If a designer decides to modify the custom digital presentation, then a product options framework is invoked to generate and display a user interface configured to modify the custom digital presentation from its product description and to present it to the designer.

If a user views the custom digital presentation and selects it, then the selection may cause the user's browser to link to the custom digital presentation service to inquire about ordering and purchasing digital products and/or physical products of the interactive design.

In the response to the selection, the system may determine the forms of ownership and license that are recorded a KeyValueJournal referenced by a token embedded in product description data and referencing the KeyValueJournal that was used to create the custom product. Based on the KeyValueJournal, the system determines how the designer may be compensated for his/her ownership of the design recorded in the KeyValueJournal.

If a user requests a digital or physical product corresponding to the interactive design, then the product description data, having the token embedded in it, may transmit the product description data along with the token to a manufacturing entity. The manufacturing entity may extract the token from the product description data and use the token to retrieve a corresponding plurality of the key-value pairs for the interactive design. Based on the pairs, the manufacturing entity may generate manufacturing instructions for manufacturing the digital or physical product.

5. Attribution Tracking

In some embodiments, the role-based collaboration and attribution-tracking comprises tracking the ownership within a customization session, tracking the licensing agreements of collaborators participating in the customization session, tracking copyrights and access privileges with respect to the assets used and modified during the session, and tracking attributions of the collaborators participating in the session. Supporting the attribution-tracking and tracking the contribution of each collaborator allows establishing the rights and ownership of the customization and customized assets.

In some embodiment, the attribution-tracking is facilitated by applying global-key-values associated with ownership and copyright keys to a, so called, journaled list of key-value pairs. As described later, a journaled list of key-value pairs is a list of global-key-value pairs collected during a customization session, and organized sequentially in a form of, for example, an attribution tree, such the tree shown in FIG. 2C. The journaled list of key-value pairs provides a means that can be used to track ownership. An example process illustrating the interactions during a customization session is depicted in FIG. 2D. However, it should be appreciated that other copyright or licensing agreements may be used than those described herein.

FIG. 2D is a flow diagram showing an example process implementing role-based collaboration and attribution-tracking.

5.1. Initialization

In step 22, a single user interaction with a collaboration platform is initiated by a user. The interaction with the collaboration platform is also referred to herein as a session. By initiating the session, the user may agree to assume the copyright and ownership for a work-product generated during the collaboration session. The user may also agree to allow the licensing of that copyright for the manufacture of a custom product later on generated based on the work-product. These agreements may be implicit or explicit, or both. The user may be referred herein as an owner or as a user1.

Subsequently to the agreements, a product description is initiated for the work-product, and then modified to include the user1's ownership key-value, copyright key-value, and the licensing key-value of the licensing agreement. For example, the following global-key-value set may be generated: {Owner, user ID1}, {Copyright, user ID1}, {License, user ID1}.

5.2. Inviting Others to Collaborate

In step 24, an invitation request from the user1, to invite a user2 to the collaboration session, is detected. The invitation request may be generated as the user1 selects a user interface element to invite the user2 to collaborate on the design. In response to the invitation request, an invitation is generated and sent to the user2. The invitation may have an encoded key that allows the user2 to join the interaction, i.e., the customization session. The user2 may be presented with an interface that allows the user2 to define and confirm the role that the user2 has been assigned. Suppose that the user2 is assigned a role of a viewer.

Subsequently to inviting the user2, the user2 is added to the product description for the work-product as a viewer.

Upon accepting the invitation, the user2 agrees to the license agreement of the user1 and agrees to contribute to the user1's work product and copyright.

5.3. Updating Global-Key-Values

Subsequently, the product description for the work-product is modified to include the user2's copyright key-value, and the licensing key-value of the user2's licensing agreement.

In step 26, a test is performed to determine whether the user1 selected, using the capabilities of the user1's UI, a location-based attribute group for a customized product, and if so, whether the user1 is making a modification to any of the attributes.

If a modification is detected, then step 28 is performed. Otherwise, the test is repeated in step 26 or a different test is performed in step 30.

In step 28, the modification is transmitted as serialized key-value pairs and associated binary data to a product options framework. An example of the product options framework is framework 110 described in FIG. 1.

Referring again to FIG. 2D, upon receiving the modification, the framework updates the product description for the customization session. Furthermore, the framework generates a journaled action of the user1, and tags it with the user1's ownership token.

Also, in this step, the product description updates the GUIs of all collaborators, i.e., the user1 and the user2.

Suppose that subsequently, the user1 selects a user interface element to change the for the user1 from a viewer to an editor to allow the user2 to edit the product description for the customization session. The information about the new role of the user2 is saved and tagged with the ownership of the user2.

Suppose that the user2 starts modifying attributes of the customized product. Suppose that the user2 chooses, using the capabilities of his GUI, a front design area attribute group for the customized product, and makes a modification to the attributes.

In step 30, a test is performed to determine whether the user2 selected, using the capabilities of the user2's UI, an attribute group for a customized product, and if so, whether the user2 is making a modification to any of the attributes.

If a modification is detected, then step 32 is performed. Otherwise, the test is repeated in step 26.

5.4. Transmitting Modifications to a Framework

In step 32, the modification is transmitted as serialized key-value pairs and associated binary data to a product options framework. The modification may be uploaded and represented as, for example, a JPEG image to be displayed as the work product of the user2. User2. The user1, however, is still responsible financially because the user1 has initiated the session.

Upon receiving the modification, the framework generates a journaled action of the user2, and tags it with the user1's ownership token. The JPEG image may be tagged with the user2's copyright information. The journaled action is tagged with the user2's license of their copyright for use in the work product of the collaboration with the user1. Thus, the user2 let the user1 to use the license. Embedded in the chain is the license of the user2 that the user2 signed when he started the collaboration and gave it to the user1. Then, the framework updates the product description for the customization session.

Also, in this step, the product description updates the GUIs of all collaborators, i.e., the user1 and the user2.

5.5. Storing Global-Key-Values

In step 34, which is performed when no more modifications are provided by either the user1 or the user2, and thus, which is performed at the end of the customization session, the modifications to the work product of the collaboration are stored as journaled key-values (KeyValueJournal) in, for example, global-key-values database 103, shown in FIG. 1. Furthermore, the collaboration session ends, and its work product and ownership are recorded.

In some embodiments, the journal itself has a universally unique identifier (UUI). Furthermore, the KeyValueJournal may be assigned a Universally Unique Identifier Code (UUID).

6. Example Graphical User Interfaces

In the context of role-based collaboration, a graphical user interface (GUI) may be designed to support collaboration between users on interactive digital designs. The GUI may be used to, for example, facilitate collaboration between customers, peers, customer support agents, designers and others by providing the functionalities that allow enhancing the product customization process. The organization and appearance of the GUI may vary and may depend on the implementation. An example of the GUI designed to facilitate collaboration is described below.

Figure 3:
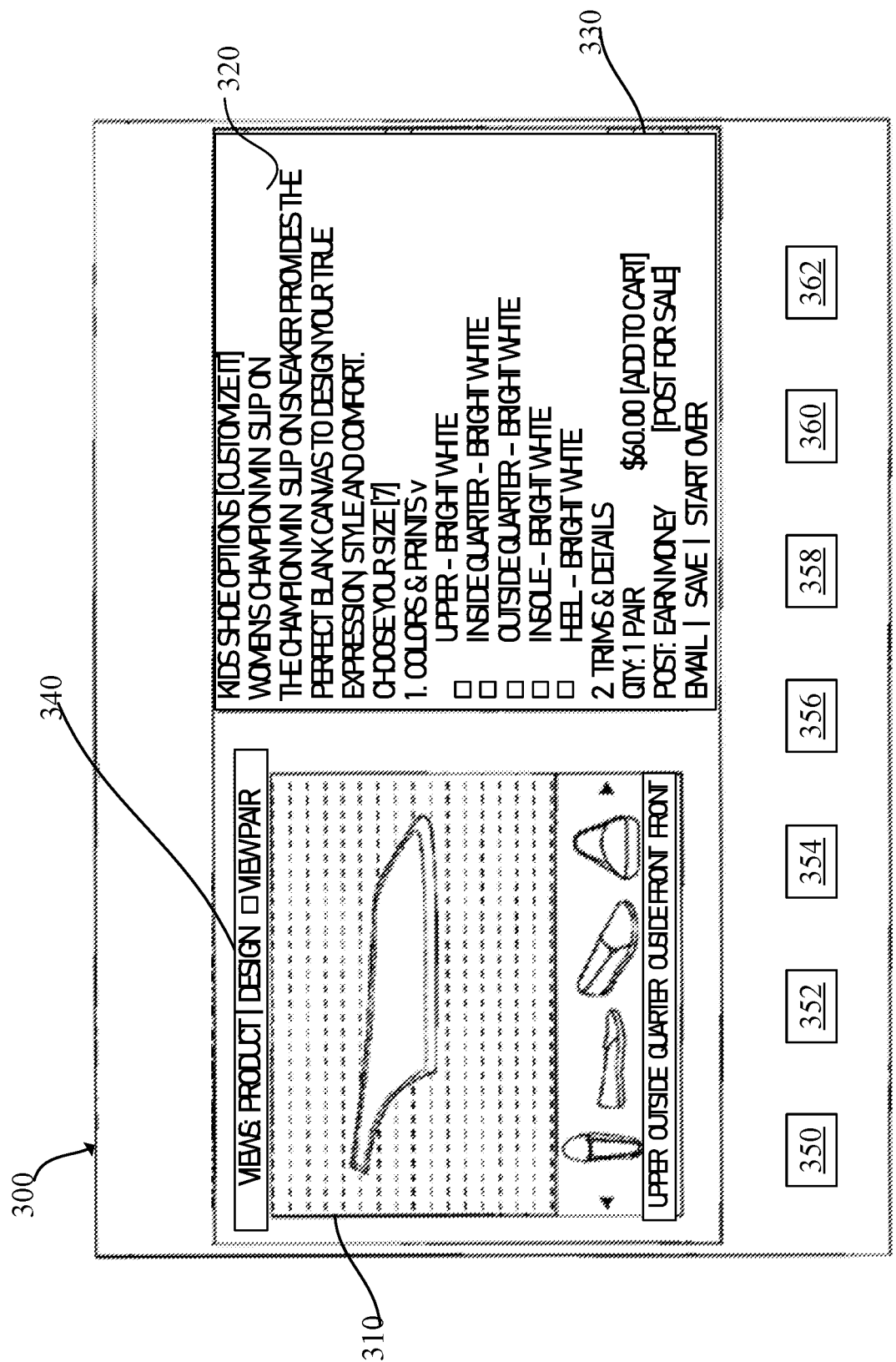
FIG. 3 shows an example graphical user interface configured to enable a role-based collaborative design of custom products based on manufacturing constraints.

FIG. 3 shows an example graphical user interface 300 configured to enable a role-based collaborative design of custom products based on manufacturing constraints. GUI 300 includes a design area 310, a product attribute area 320, a trim and detail area 330, a tab area 340, and one or more functional request selectors 350-362 that are configured to provide support for a role-based collaborative design. In other implementations, GUI 300 may include additional areas, request selectors, sliders, text boxes, and other interactive objects and elements. In other implementations, GUI 300 may show a different arrangement of the interface components than the one shown in FIG. 3.

6.1. Collaboration Request Selectors

One or more functional request selectors 350-362 may be configured to facilitate collaboration between users. The arrangement and appearance of request selectors 350-362 may vary. Some of the request selectors may be implemented as push-buttons, others may be implemented as touch-sensitive objects, touch-screen areas, selectable objects, toggles or switches.

To provide clear examples, request selectors 350-362 shown in FIG. 3 are implemented as selectable objects and include a request selector 350 for requesting a collaboration with a customer support agent or a designer; a request selector 352 for requesting a collaboration with a customer peer; a request selector 354 for requesting a serialized channel to communicate with other users; a request selector 356 for requesting publishing functionalities; a request selector 358 for requesting playback functionalities; a request selector 360 for requesting collaboration on a journaled list; and a request selector 362 for requesting tagging functionalities. Other implementations of GUI 300 may include additional request selectors and additional request selector functionalities.

6.2. Example Components of a GUI

Design area 310 may include one or more regions for displaying one or more two-dimensional (2D) views of an interactive digital design. Design area 310 may also include one or more 3D views of the interactive digital design, and/or one or more 2D/3D views of components of the interactive digital design. The example shown in FIG. 3 depicts design area 310 having a region for showing a part component of an interactive digital design of a shoe, and a region for showing different views of the shoe.

Product attribute area 320 may include one or more regions for displaying a variety of attributes defined for an interactive digital design, corresponding selectors for selecting values for the attributes, and different interactive objects for customizing the interactive digital design.

Trim and detail area 330 may include one or more regions for displaying a variety of options for, for example, ordering a product corresponding to an interactive digital design shown in design area 310. Trim and detail area 330 may include, for example, a region for displaying interactive buttons for ordering the product, for specifying shipping instructions, and so forth.

Tab area 340 may include one or more interactive tab-objects configured to allow a user to select different sets of the GUI's functionalities. Tab area 340 shown in FIG. 3 shows three tab-objects; however, the count and types of the tab objects is not limited to the ones shown in FIG. 3. A first tab-object may allow a user to select, for example, the functionalities for creating and modifying an interactive digital design. A second tab-object may allow the user to select the functionalities for displaying views of a product corresponding to the interactive digital design. A third tab-object may allow the user to search the GUI's functionalities, and a fourth tab-object may allow the user to select a new design or start modification to a default design.

6.3. GUI Functionalities

GUI 300 may provide support for displaying a set of attributes defined for an interactive digital design and for modifying the values of the attributes. In some embodiments, the attributes and attribute values may be displayed in, for example, product attribute area 320 shown in FIG. 3.

Example of the attributes may include substrate choices (such as a substrate color, a substrate texture, and a substrate size), customization process choices (such as process constraints, process manufacturing information structure), and design area choices (such as design area constraints and a design area mapping).

GUI 300 may provide support for a variety of choices for design interactions. The choices may be filtered by product choices, process and design area constraints, design area choices, and graphics choices. The graphics choices may include images, vectors, shapes (such as a circle, rectangle, polygonal, and curvilinear), lines (such as thickness and color), and fill (such as color and texture). Graphics choices may also include selections based on a cut area, embossing/debossing, and surface characteristics (such as color, reflectivity, refraction, diffraction, transparency, and texture).

GUI 300 may provide support for a variety of edit actions that users may perform with respect to interactive objects. The edit actions may include adding a graphics or decorative entity to the design and modifying the graphics or decorative entity in the design. This may include transformations (such as translation, rotation, scaling, shearing, mirroring, deformation, and projection). The edit actions may also include a vector change, a cut area change, an embossed area change and a surface change. In some embodiments, the edit functions may be encoded as a structured data stream.

In some embodiments, an edited interactive digital design is represented in a form of an active data model and associated edit data. The model may impose constraints on the design, filter edits based on substrate choices, filter edits based on a customization process, and remap edits based on an input design area view.

An active data model may be updated for each shared view available in GUI 300. The updates for a given view may be rendered or filtered based on a device type, a user role, and/or a design view.

In some embodiments, encoded edit data and an active data model may be journaled. The journaling may be performed according to actions pertaining to a specific custom product, actions pertaining to a specific shared session, and actions pertaining to a design of a custom product.

Encoded edit data and an active data model for an interactive digital design may be shared between users. The sharing may be performed in real time or a pseudo real time. Encoded edit data and an active data model for an interactive digital design may be used to archive edit state for the design. For example, journaled data and models may provide undo operations, version control of shared design session operations, playback of a shared design session operations, and the like.

6.4. Creating and Modifying Interactive Digital Design S

Example GUI 300 shown in FIG. 3 may be used to support collaborations between users in a process of customizing interactive digital designs. Customization of an interactive digital design may include creating the design and modifying the design. To be able to customize the design, the customer may request access to a product description data associated with the interactive digital design. To be able to collaborate with others, such as peers, customer support agents, graphics designers and others, the customer may request collaboration sessions using, for example, the functionalities of request selectors 350-362, shown in FIG. 3.

To initiate a modification session, a computer collaboration system may generate a user interface for a user. The interface may be generated based on, at least in part, information stored in a user profile. That information may include information indicating the user's role. The user interface may include the functionalities that are specific to the user, and that allow the user to collaborate with others, modify the attributes of an interactive digital design, store the modifications in a product description associated with the interactive digital design, store the modifications in a journaled list of modifications for the interactive digital design, prune and reorder the journaled list, and publish the rendering of the modified interactive digital design.

In some embodiments, the computer collaboration system may cause displaying, in a user interface executing in a user device of the user, an interactive digital design along with annotations representing attributes, attribute groups and the locations within the design to which the attributes apply. The attributes, default values for the attributes and default ranges for the values for the attributes may be provided by an attribute engine which may be part of the computer collaboration system. The attribute engine may define and/or filter the attributes according to constraints provided by manufacturers, designers or system administrators.

In response to receiving, in the user interface, a rendering of the interactive digital design with the annotations, a user may select, using the functionalities of the user interface, a specific attribute or a specific attribute group at a specific location within the depiction of the interactive digital design and select or adjust a value associated with the attribute. For example, the user may select a width-attribute and use a slider object, provided by the user interface, to set a new value for the width parameter. The new value of the parameter may be transmitted as a serialized key-value pair to a product options framework.

Upon receiving a serialized key-value pair, the product options framework may store the serialized key-value pair in a journaled list of modifications for the interactive digital design.

Upon receiving a request to view the journaled list from the user, the attribute engine may provide the journaled list to the user interface executing on the user device and cause the user interface to display the journal list. At this point, the user may review the modifications included in the journaled list, reorder the modifications included in the list, remove some modifications from the list and/or request applying of the modifications included in the list to the interactive object. The user may also request generating a rendering of the current interactive digital design. If the rendering of the current interactive digital design is completed, the user may view the rendering in any of a plurality of available views.

In some embodiments, the user may accept the rendered depiction of the modified design and request that the customized design be sent to a manufacturer or a distributor. Then the user may place an order for an actual product that is based on the customized design provided to the manufacturer or distributor.

7. Collaboration Examples

Collaboration platform 10 may support a variety of collaboration sessions. The collaboration session may be established between two or more users. The types of collaboration sessions may depend on the roles that are assigned to the users who participate in the sessions. For example, a customer may collaborate with a customer support agent, engage in a creative work with a graphic designer, ask an agent or a designer for help in modifying a custom product template, collaborate with the customer's peers, watch a custom product designer create a design in real time, watch a custom product designer demonstrate how to create a design offline, watch a preview of how to create a specific custom product, and/or watch an edited set of journaled actions performed by a graphics artist to learn how to solve a specific design problem.

7.1. Customer-Agent Collaboration

A customer may collaborate with a customer support agent and/or a designer. For example, a customer may request that a customer support agent help the customer to customize an interactive digital design and show the customer how the agent would modify the interactive digital design to achieve the design that the customer would like to see.

Examples of collaboration sessions between a customer and a customer support agent and/or a designer may include situations when a customer is exploring a product webpage in a marketplace site and needs help tweaking the design, such as a party invitation, a mug design, and the like. Another example may include a situation when a customer is exploring a product webpage in a marketplace site depicting a picture of a mug and wants to tweak the design. Other examples may include a situation when a customer found an interesting design of a wedding invitation, a holiday card, a custom blanket, or the like, but does not know how to modify the design. In some other situations, a customer wants to contact a customer service or call a helpdesk and ask for assistance in using the collaboration tools.

FIG. 2A is a block diagram showing collaboration examples. In FIG. 2A, examples of customer-agent collaboration sessions include a session 252 between a customer 202 and a customer support agent 216, a session 254 between a customer 208 and a customer support agent 210, a session 264 between a customer 214 and a designer 212, a session 266 between customer 208 and designer 212, a session 268 between a customer 214 and a designer 212, a session 270 between a customer 214 and customer support agent 216, and a session 272 between customer 202 and designer 212.

In some embodiment, a customer may use email, text, phone, and any other type of communications to describe to a customer support agent the design that the customer would like to achieve. Once the customer explains to the agent the desired design, the customer may select, from his user interface, a user interface element that would allow setting an editor role to the agent so that the agent could edit the interactive digital design for the customer. This would include granting the agent access to a product description associated with an interactive digital design as an editor.

In response to that, the agent may be provided with an updated user interface or a new user interface that would allow the agent to modify the interactive digital design. For example, the agent could select, from his user interface, a location-based attribute (or a group of attributes) and modify a value associated with the attribute, select another attribute and modify it, and so forth. Each modification may be automatically saved as a serialized key-value pair, and this solves the technical problem of navigating through countless sets of attributes and dealing with, for example, countless clicks to complete the customization as required in conventional customization platforms. The pairs may be transmitted to a product options framework, which would update the product description for the interactive digital design. Then, a product options framework may render a modified depiction of the interactive digital design and propagate the rendering to the user devices for rendering in the corresponding user interfaces. An example of collaboration between a customer and a customer support agent (or a designer) is described in detail in FIG. 4.

In some embodiments, a customer who tries to customize an interactive digital design may seek assistance from a customer support agent or a graphics designer. Suppose that the customer is trying to modify some attributes of the interactive digital design to achieve a particular appearance of the design; however, he would like to ask a customer support agent for help in modifying the design. The customer is referred to herein as a first user, while the agent is referred to a second user.

Figure 4:
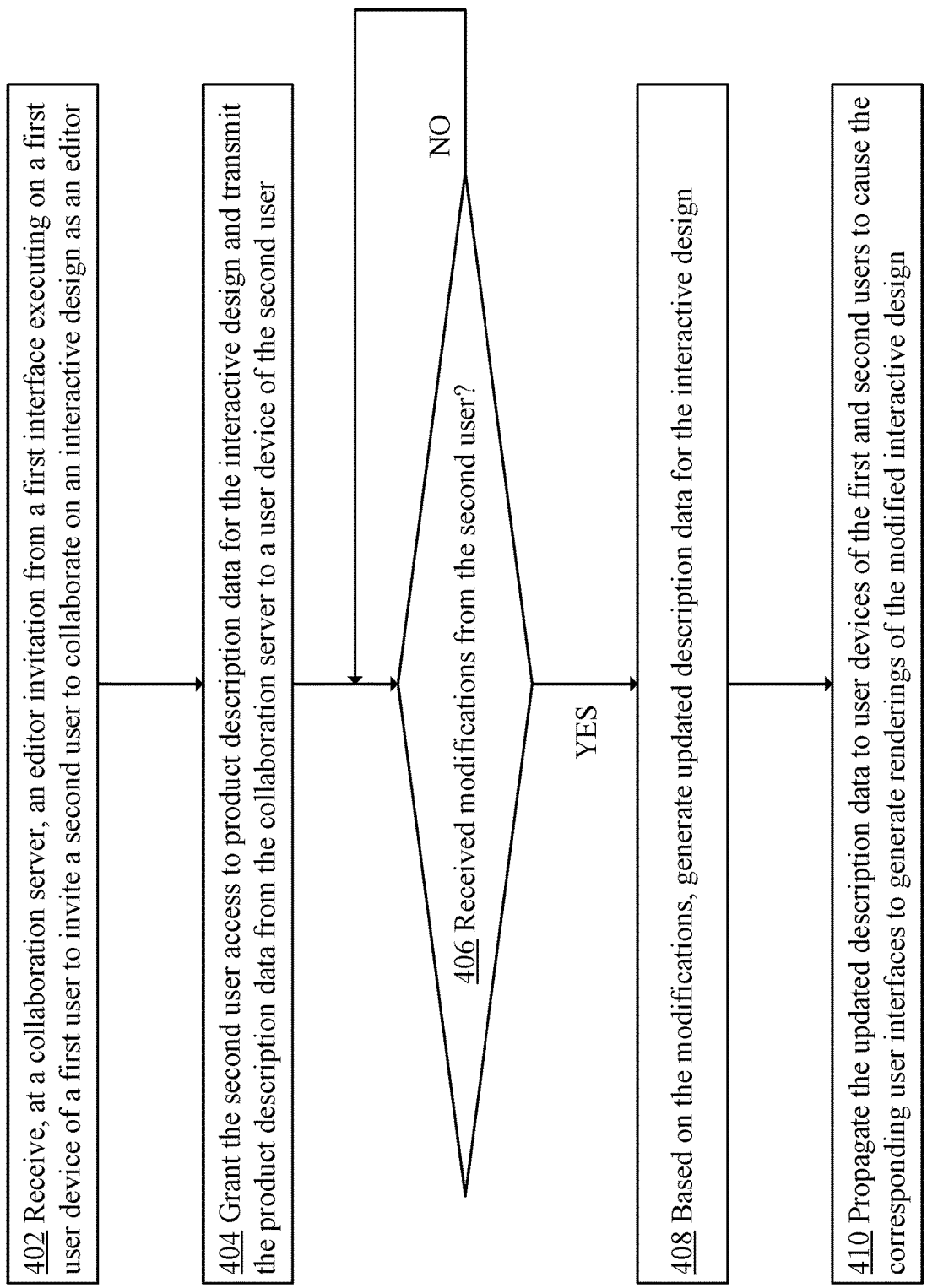
FIG. 4 is a flow diagram showing an example process implementing role-based collaboration between a customer and a customer support agent.

FIG. 4 is a flow diagram showing an example process implementing role-based collaboration between a customer and a customer support agent. FIG. 4 and each other flow diagram herein is intended as an illustration at the functional level at which skilled persons, in the art to which this disclosure pertains, communicate with one another to describe, and implement algorithms using programming. The flow diagrams are not intended to illustrate every instruction, method object or sub-step that would be needed to program every aspect of a working program but are provided at the same functional level of illustration that is normally used at the high level of skill in this art to communicate the basis of developing working programs.

In step 402, a computer collaboration system receives an editing invitation from a first interface executing on a first user device associated with a first user. The editing invitation may be sent to invite a second user to collaborate on an interactive digital design as an editor. The invitation may also indicate that the first user wants the computer collaboration system to grant the second user access to data that is specific to the interactive digital design. The data may be stored as product description data of a product description in, for example, product data definitions 104, shown in FIG. 1.

In step 404, the collaboration system grants the second user access to the product description data for the interactive digital design and transmits the product description data to a user device of the second user. In some embodiments, the collaboration system may also transmit access keys to the second user to allow the second user to access the product description data associated with the interactive digital design. Furthermore, since the second user is invited to edit the interactive digital design, the collaboration system may access user profile data 102 to verify a role assigned to the second user, and update user profile data 102 for the second user if needed.

Granting the second user access to the product description data of the interactive digital design as an editor will allow the second user to not only modify the attributes of the interactive digital design, but also to save the modifications in a journaled list. For example, if the second user modifies the interactive digital design, then the modification may be stored in a journaled list associated with the product description of the interactive digital design.

Typically, a modification is used to modify a single product attribute of the interactive digital design. However, if the second user modifies several attributes, then each key-value pair may be added to the journaled list. A plurality of key-value pairs and associated data may be stored in the journaled list according to a chronological order or any other order defined by the users.

A journaled list may be modified by users who have assigned roles as, for example, customers, customer support agents, or designers. They may remove a modification and remove a corresponding key-value pair and corresponding data associated with the modification from the product description for the interactive digital design.

In step 406, the collaboration system determines whether any modifications for the interactive digital design are received from the second user. If the modifications are received from the second user, then the collaboration system performs step 408. Otherwise, the collaboration system performs step 406.

In step 408, the collaboration system parses the modifications received from the second user, and based on the parsed information, generates updated product description data for the product description for the interactive digital design.

In step 410, the collaboration system propagates the updated product description data to the user interfaces executing on the user devices of the first and second users to cause the user interfaces to generate and display corresponding renderings of the modified interactive digital design.

7.2. Customer-Peer Collaboration

A customer may collaborate with a customer peer. For example, a customer may request that a peer view an interactive digital design that the customer is working on, and, for example, provide feedback to the customer. Referring to FIG. 2A, examples of this type of collaboration sessions include a session 256 between customer 202 and a peer 204, a session 260 between customer 202 and a peer 206, and a session 262 between customer 208 and peer 206.

To involve a peer in a collaboration session, a customer may select, from his user interface, a user interface element that would allow setting a viewer role to the peer so that the peer could view the interactive digital design as the customer modifies the design. This would include granting the peer access to a product description associated with an interactive digital design as a viewer.

In response to that, the peer may be provided with an updated user interface or a new user interface that would allow the peer to view the interactive digital design. Once the customer selects, from his user interface, a location-based attribute (or a group of attributes) and modifies a value associated with the attribute, and so forth, each modification would be reflected in a user interface displayed for the peer. Each modification performed by the customer may be saved as a serialized key-value pair, and the pairs may be transmitted to a product options framework, which may update the product description for the interactive digital design. Then, the product options framework may render a modified depiction of the interactive digital design and propagate the rendering to the user devices for rendering in the corresponding user interfaces.

Once the peer has a chance to view, in the peer's user interface, the rendering of the interactive digital design, the peer may provide his feedback and comments to the customer. The peer may provide his feedback/comments to the customer via email, text, phone, or the like. An example of collaboration between a customer and a peer is described in detail in FIG. 5.

In some embodiments, a customer may seek feedback from his peers on an interactive digital design. Suppose that the customer is trying to modify some attributes of the interactive digital design to achieve a particular appearance of the design, and the customer would like to ask his peer for his opinion on the customization. The customer is referred to herein as a first user, while the peer is referred to a second user.

Figure 5:
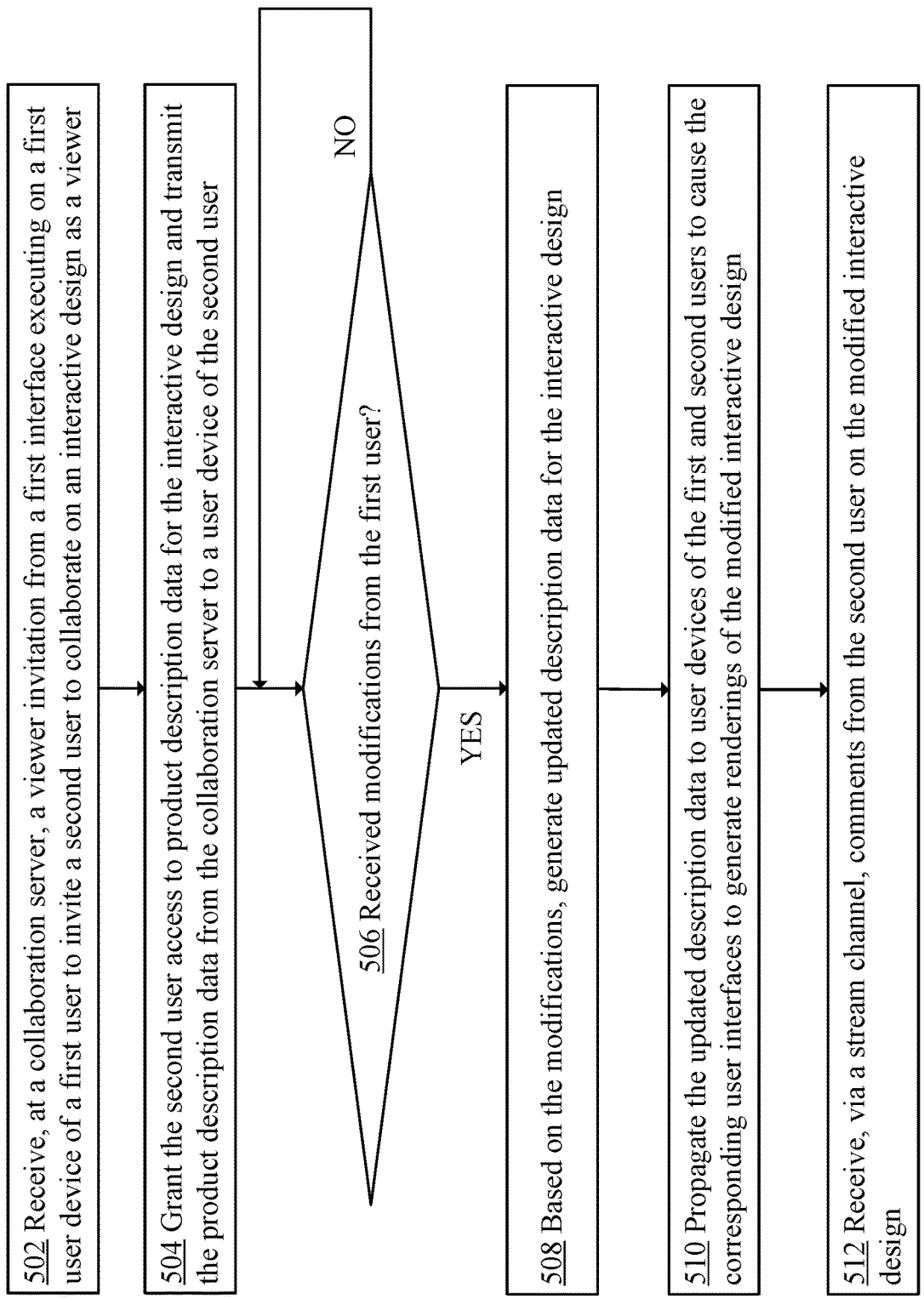
FIG. 5 is a flow diagram showing an example process implementing role-based collaboration between a customer and a customer peer.

FIG. 5 is a flow diagram showing an example process implementing role-based collaboration between a customer and a customer peer. In step 502, a computer collaboration system receives a viewer invitation from a first interface executing on a first user device associated with a first user. A viewer invitation may be sent to invite a second user to collaborate on an interactive digital design as a viewer. The invitation may also indicate that the first user wants the computer collaboration system to grant the second user access to product description data for the interactive digital design.

In step 504, the collaboration system grants the second user access to the product description data for the interactive digital design and transmits the product description data to a user device of the second user. In some embodiments, the collaboration system may also transmit access keys to the second user to allow the second user to access the product description data associated with the interactive digital design.

In step 506, the collaboration system determines whether any modifications for the interactive digital design are received from the first user. If the modifications are received from the second user, then the collaboration system performs step 508. Otherwise, the collaboration system performs step 506.

In step 508, the collaboration system parses the modifications received from the first user, and based on the parsed information, generates an updated product description for the product description for the interactive digital design. In this step, the collaboration system also generates updated product description data for the product description for the interactive digital design.

In step 510, the collaboration system propagates the updated product description data to the user interfaces executing on the user devices of the first and second users to cause the user interfaces to generate and display renderings of the modified interactive digital design.

In step 512, the collaboration system receives comments from the second user on the modified interactive digital design and passes the comments to the first user. The comments may be received via, for example, a separate channel, such as a stream channel, described above. The comments may include an approval of the design and/or suggestions for improving the design.

The collaboration system may also receive, via the stream channel, comments from the first user, and may communicate those comments to the second user. The users may continue communicating with each other as the first user modifies the interactive digital design.

7.3. Education and Management Collaboration

Designers, artists, and customer service agents may prepare, and broadcast tutorials and lectures related to product customization and tools configured to customize the products. For example, a designer may announce a tutorial collaboration session to a group of users and allow the users to join his collaboration session at a given day and at a given time.

Managers of marketplace websites and developers of product customization sites may monitor collaboration sessions established between users who access the sites. For example, a site manager may want to monitor the quality of customer support team by tapping to the collaboration sessions that the customer support teams use to provide support to customers.

Managers and developers of marketplace websites may communicate with each other via collaboration sessions to discuss improvements to their sites, customer services, and product handling alternatives.

Social media coordinators may contact managers and developers of marketplace websites via collaboration sessions to seek advice on designing products such as event flyers, event invitations, promotional materials, brand paraphernalia and insignia, and other products. The coordinators may also provide, via the collaboration sessions, feedback on the marketplace websites, the customer services, and potential improvements.

7.4. Collaboration Using Serialized Streams

Two or more users may communicate and collaborate with each other using serialized streams such as side channels. The serialized streams may be configured to support multi-party communications such as text messaging, voice communications, and video communications. Referring to FIG. 2A, examples of this type of collaboration sessions include a session 258 between peer 204 and peer 206, and a session 274 between designer 212 and customer support agent 210.

For example, a customer may design an initial version of an interactive digital design and, using the approach described above, invite his peer to view the design. Using an additional communications side channel, the peer may provide comments on the design, suggest changes to the design, or ask questions about the design. The customer may use the same side channel to provide comments, questions and/or suggestions to the peer. The customer and the peer may communicate with each other via the side channel by exchanging text messages, voice messages and/or video communications.

7.5. Publishing

A user may publish his own interactive digital design to a collaboration team. For example, using the functionalities of a user interface, a user may select a user interface element that is configured to publish a collaboration invitation to his collaboration team. The invitation may be encoded with a key that allows the users of the collaboration team to view a sequence of edits that the user has been making to his own interactive digital design. The collaboration team may passively watch the design process in real time and may comment on the design using, for example, an additional communications channel, described above.

In broad terms, publishing may include publishing a list of editing instructions so that the instructions may be viewed by other users and publishing a list of editing instructions so that other users may, in turn, perform editing actions on the list of editing instructions. For example, the users may change, in the list of instructions, some key-value pairs or groups that are tagged for easy replacement.

7.6. Playback Collaboration

A user may use a collaboration platform to journal modifications made to an interactive digital design and to playback the journaled modifications. For example, a user may select, from a user interface, a user interface element that is configured to mark a start point in a journaled list. As the user performs a series of edits on the interactive digital design, the modifications, including key-value pairs, are transmitted to a product options framework which stores the key-value pairs in the journaled list. When the user finishes modifying the interactive product, the user may select another user interface element that instructs the product options framework to mark an end point in the journaled list. Then, the user may select a user interface item to playback the journaled instructions from the start point to the end point to view the series of modifications performed by the user on the interactive digital design.

7.7. Journaled List Collaboration

A user may collaborate with other users to modify a journaled list. For example, a user may select a set of user interface elements that are configured to transmit key-value pairs from the user interface to a product options framework as the user modifies an interactive digital design. Upon receiving the pairs, the product options framework may store the pairs in a journaled list and allow the user and his peers to perform editing or transformation operations on the list.

The types of editing or transformation operations that may be performed on the journaled list may include modifying values within a specific key-value pair stored in the list and modifying a single product attribute in a product description associated with the interactive digital design. The operations may also include removing a specific key-value pair from the list; removing all key-value pairs and associated data that do not directly contribute to a final form of the interactive digital design; re-ordering the key-value pairs and associated data, so that a final form of the interactive digital design is preserved, and edits that apply to a specific attribute group are performed in-sequence; and extending an editing operation and re-ordering operations, then grouping certain key-value pairs related to specific attribute groups, design areas, or location-based attributes, so that they may be edited as a single group. The operations may also include extending the editing operation listed above, so that key-value pair groups may be stored in memory for use later.

7.8. Tagging

A user may collaborate with other users in creating and using tags. For example, a user may tag key-value pairs that apply an image, a vector graphic, a 3D model or other media to an interactive digital design so that the tagged object may be easily replaced in future edits. The operations may also include tagging key-value pairs that apply the text, color, surface qualities or other attribute groups, so that the attributes may be easily replaced in future edits. This may allow customizing an interactive digital design using a couple of clicks, not navigating through countless clicks as required by conventional platforms to complete the customization.

Tagging may also include associating text, voice and/or video annotation with a specific key-value pair or key-value group in a journaled list. Tagging may also include uploading, converting, parsing and/or transforming editing operations from another compatible source and applying the editing operations to a product description associated with the interactive digital design.

8. Manufacture of Custom Digital Products

Suppose that a custom digital product is a customized greeting card. Furthermore, suppose that in the course of one or more collaboration sessions, collaborators developed an interactive, digital design of the customized greeting card. The processes described above may be employed to digital print the customized greeting card.

In some embodiments, various means are provided for handling manufacturing of custom products provided in a digital form. In this context, a digital product is a product that may be fully realized in software and digital media. Such products may have functionalities that are similar to functionalities of physical products. For example, it is possible to manufacture a physical custom greeting card using the methods described herein, and it is also possible to produce a digital greeting card by using very similar means. Instead of publishing a greeting card using a printing process, a digital greeting card may be manufactured by publishing it in a digital form which may be viewed by a specific digital service.

Constraints for generating digital and physical greeting cards may be similar. The constraints may be managed by a product options framework, described above. Furthermore, generating digital and physical greeting cards may have the resolution constraints. That means that for an optimal quality of the visual presentation of the cards, each card generating process may have a constraint in the number of pixels-per-inch that is required.

Furthermore, generating digital and physical greeting cards may have the size and ratio aspect constraints. Based on the paper size in the physical case, and on screen size in the digital case, there are constraints on the formatting and placement of design elements for the greeting card.

Moreover, both have color constraints. Each may have a target ICC color profile that imposes a specific gamut of colors for manufacturing the product. In the case of the physical product, it may be a CMYK profile such as U.S. Web Coated (SWOP) v2. In the case of the digital version, it may be sRGB IEC61966-2.1. Publishing each product requires rendering each design element to fit the constraints.

Furthermore, both are published using manufacturing instructions that meet specific digital standards. Each must be expressed as a specific set of manufacturing instructions that meet the constraints. Finally, the customization and collaboration of each are usually the same.

In some embodiments, supporting digital products may include, but is not limited to, greeting cards, invitations, business insignias (such as logos, email and social media tags), birth announcements, personal identities, corporate communications, and virtual products, and as a token or representation of a physical product.

9. Improvements Provided by Certain Embodiments

In some embodiments, a system and a computer-implemented method allow role-based and attribution tracking collaborative design of custom products based on manufacturing constraints. The system and method enable collaboration between many users, applications and websites and allow, for example, customers and designers to share their work, contributions, licenses, and knowledge on product-customization tasks. The approach allows the customers to access, for example, many applications and websites to engage specialists and experts to provide help with specific tasks and designs.

In some embodiments, a system and a computer-implemented method allow overcoming the difficulties in navigating through countless sets of attributes and choices that are difficult to understand using conventional product-customization platforms. The method and the system provide a solution to a problem of navigating through a myriad of attributes to achieve the desired customization of the product efficiently and effectively.

A computer collaboration system may be configured to coordinate interactions between users according to the roles assigned to the users. Information about the roles assigned to the users may be used to generate improved user interfaces that are specific to the users and the users' roles.

10. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
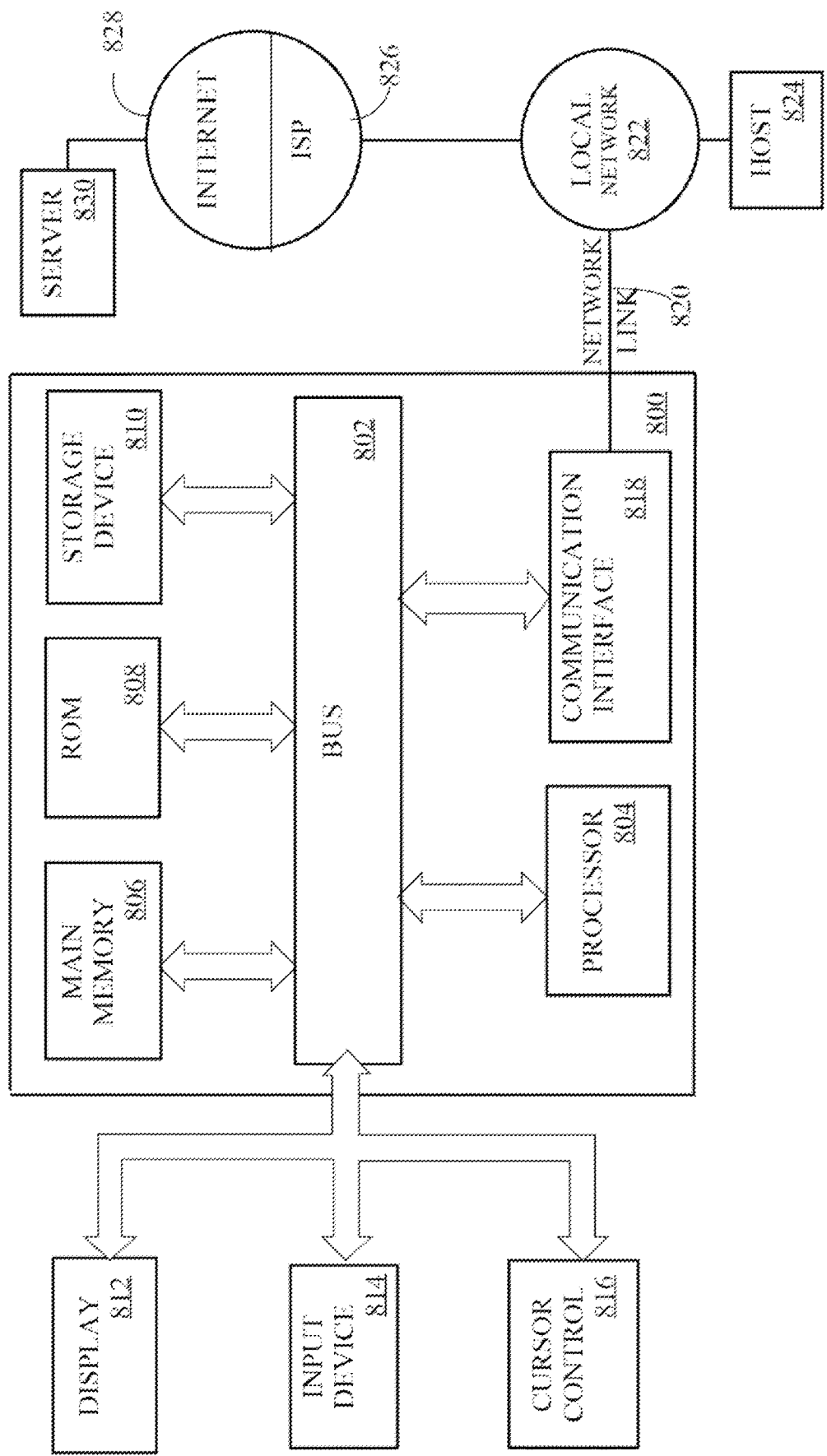
FIG. 8 is a block diagram of a computer system on which embodiments of the approach may be implemented.

FIG. 8 is a block diagram that depicts an example computer system 800 upon which embodiments may be implemented. Computer system 800 includes a bus 802 or other communication mechanism for communicating information, and a processor 804 coupled with bus 802 for processing information. Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. Although bus 802 is illustrated as a single bus, bus 802 may comprise one or more buses. For example, bus 802 may include without limitation a control bus by which processor 804 controls other devices within computer system 800, an address bus by which processor 804 specifies memory locations of instructions for execution, or any other type of bus for transferring data or signals between components of computer system 800.

An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input-device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic or computer software which, in combination with the computer system, causes or programs computer system 800 to be a special-purpose machine. According to one embodiment, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 800, various computer-readable media are involved, for example, in providing instructions to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated service digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world-wide packet data communication network now commonly referred to as the "Internet" 828. Local network 822 and Internet 828 both use electrical, electromagnetic, or optical signals that carry digital data streams.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for generating digital product tokens to represent digital and physical products, the method comprising:
    storing, by a computer collaboration server, a plurality of key-value pairs associated with an interactive digital design at a location in storage;
    wherein the plurality of key-value pairs comprises a plurality of product attributes and corresponding values for the interactive digital design;
    wherein, based on the plurality of key-value pairs, an ownership-attribute tree including a plurality of ownership key-values is constructed;
    wherein the ownership-attribution tree is a data graph representing one or more relationships between users participating in creating the interactive digital design;
    based on, at least in part, the plurality of key-value pairs, generating product description data for the interactive digital design;
    generating a token indicating the location at which the plurality of key-value pairs is stored;
    embedding the token into the product description data of the interactive digital design; and
    in response to receiving a request for a product corresponding to the interactive digital design:
        transmitting the product description data with the token embedded in the product description data to a manufacturing entity to cause the manufacturing entity to:
        extract the token from the product description data, use the token to retrieve the plurality of key-value pairs from the location,
        generate manufacturing instructions based on the plurality of key-value pairs and the ownership-attribute tree,
        transform the manufacturing instructions, generated based on the plurality of key-value pairs and the ownership-attribute tree, to a specific set of manufacturing instructions that meet specific digital standards determined based on manufacturing constraints,
        store the specific set of manufacturing instructions, which meet the specific digital standards, in association with the request,
        based on the specific set of manufacturing instructions, automatically generate publishing instructions,
        transmit the publishing instructions in real time to specific digital devices to cause the specific digital devices to manufacture, based on the publishing instructions, the product corresponding to the interactive digital design.

2. The method of claim 1, further comprising:
    displaying one or more graphical representations of one or more interactive digital designs corresponding to one or more physical custom products;
    in response to receiving a request for a particular custom product corresponding to a particular graphical representation selected from the one or more graphical representations:
        transmitting particular product description data of the particular graphical representation with a particular token embedded in the particular product description data to the manufacturing entity to cause the manufacturing entity to extract the particular token from the particular product description data, use the particular token to retrieve a particular plurality of key-value pairs, and use the particular plurality of key-value pairs to manufacture the particular custom product.

3. The method of claim 1, further comprising:
    displaying one or more graphical representations of one or more interactive digital designs corresponding to one or more physical custom products;
    in response to receiving a request to further customize a particular interactive digital design corresponding to a particular graphical representation selected from the one or more graphical representations:
        extracting a particular token from particular product description data of the particular graphical representation corresponding to the particular interactive digital design, and use the particular token to retrieve a particular plurality of key-value pairs;
        generating a modified plurality of key-value pairs upon receiving modifications to the particular plurality of key-value pairs as the particular interactive digital design is modified;
        based on, at least in part, the modified plurality of key-value pairs, generating modified product description data of a modified interactive digital design;
        generating a new token indicating the modified plurality of key-value pairs;
        embedding the new token into the modified product description data.

4. The method of claim 1, wherein the plurality of key-value pairs captures a sequence of steps of an interactive process for creating the interactive digital design;
    wherein the token captures manufacturing instructions for generating a sequence of frames corresponding to a sequence of steps of the interactive process for creating the interactive digital design;
    wherein the method further comprises:
        in response to receiving a request for a video file capturing the sequence of frames, transmitting product description data of the interactive design with the token embedded in the product description data to the computer collaboration server to cause the computer collaboration server to extract the token from the product description data, use the token to retrieve a corresponding plurality of key-value pairs, and use the corresponding plurality of key-value pairs to generate the video file.

5. The method of claim 1, further comprising: displaying one or more graphical representations of one or more interactive digital designs;
in response to receiving a request for a particular digital image file of a particular graphical representation selected from the one or more graphical representations of the one or more interactive digital designs:
transmitting particular product description data of the particular graphical representation with the token embedded in the particular product description data to the computer collaboration server to cause the computer collaboration server to extract the token from the particular product description data, use the token to retrieve a corresponding plurality of key-value pairs, and use the corresponding plurality of key-value pairs to generate the particular digital image file.

6. The method of claim 1, wherein the token is represented as a universally unique identifier (UUID) uniquely identifying the token;
wherein the UUID is embedded in the product description data as a watermark;
wherein the UUID is embedded in the product description data in a frequency domain data of the product description data.

7. The method of claim 1, wherein the token is used to generate a 3D model of the interactive digital design;
wherein the method further comprises incorporating the 3D model into a digital animation file.

8. The method of claim 1, wherein the token indicates a location at which the plurality of key-value pairs is stored.

9. The method of claim 1, wherein the plurality of key-value pairs includes one or more of:
an attribution key-value that includes an attribution key and a universally unique identifier that references a set of software instructions for manufacturing a corresponding product;
an age restriction key-value that includes an age restriction key and an age value;
a content lock key-value that includes a content lock key and a content lock key value;
a blacklist key-value that includes a blacklist key and a blacklist;
a whitelist key-value that includes a whitelist key and a whitelist;
wherein the ownership key-value further includes an ownership key and a user universally unique identifier (user ID);
a copyright key-value that includes a copyright key and a user ID;
a license key-value that includes a license key and a universally unique identifier for a specific license agreement held between an owner or a primary designer and a computer collaboration server; or
a customer support key-value that includes a support key and a support agent contract identifier;
wherein the product description data for the interactive digital design is generated as one or more modifications to the interactive digital design are received from one or more user interfaces and are used to update the interactive digital design.

10. The method of claim 1, wherein a pair, of the plurality of key-value pairs, indicates one or more of: an image type, a vector graphics, a 3D model, a text, a color, a surface quality, or a group attribute;
wherein the plurality of key-value pairs is used to perform one or more of: attribution-tracking, tracking ownership within a customization session, tracking licensing agreements of collaborators participating in the customization session, tracking copyrights and access privileges with respect to assets used and modified during the session, or tracking attributions of collaborators participating in the session.

11. One or more non-transitory computer readable storage media storing one or more instructions which, when executed by one or more processors, cause the one or more processors to perform:
storing, by a computer collaboration server, a plurality of key-value pairs associated with an interactive digital design at a location in storage;
wherein the plurality of key-value pairs comprises a plurality of product attributes and corresponding values for the interactive digital design;
wherein, based on the plurality of key-value pairs, an ownership-attribute tree including a plurality of ownership key-values is constructed;
wherein the ownership-attribution tree is a data graph representing one or more relationships between users participating in creating the interactive digital design;
based on, at least in part, the plurality of key-value pairs, generating product description data for the interactive digital design;
generating a token indicating the location at which the plurality of key-value pairs is stored;
embedding the token into the product description data of the interactive digital design; and
in response to receiving a request for a product corresponding to the interactive digital design:
transmitting the product description data with the token embedded in the product description data to a manufacturing entity to cause the manufacturing entity to:
extract the token from the product description data, use the token to retrieve the plurality of key-value pairs from the location,
generate manufacturing instructions based on the plurality of key-value pairs and the ownership-attribute tree,
transform the manufacturing instructions, generated based on the plurality of key-value pairs and the ownership-attribute tree, to a specific set of manufacturing instructions that meet specific digital standards determined based on manufacturing constraints,
store the specific set of manufacturing instructions, which meet the specific digital standards, in association with the request,
based on the specific set of manufacturing instructions, automatically generate publishing instructions,
transmit the publishing instructions in real time to specific digital devices to cause the specific digital devices to manufacture, based on the publishing instructions, the product corresponding to the interactive digital design.

12. The one or more non-transitory computer readable storage media of claim 11, storing additional instructions for:
displaying one or more graphical representations of one or more interactive digital designs corresponding to one or more physical custom products;
in response to receiving a request for a particular custom product corresponding to a particular graphical representation selected from the one or more graphical representations:

transmitting particular product description data of the particular graphical representation with a particular token embedded in the particular product description data to the manufacturing entity to cause the manufacturing entity to extract the particular token from the particular product description data, use the particular token to retrieve a particular plurality of key-value pairs, and use the particular plurality of key-value pairs to manufacture the particular custom product.

13. The one or more non-transitory computer readable storage media of claim 11, storing additional instructions for:
displaying one or more graphical representations of one or more interactive digital designs corresponding to one or more physical custom products;
in response to receiving a request to further customize a particular interactive digital design corresponding to a particular graphical representation selected from the one or more graphical representations:
extracting a particular token from particular product description data of the particular graphical representation corresponding to the particular interactive digital design, and use the particular token to retrieve a particular plurality of key-value pairs;
generating a modified plurality of key-value pairs upon receiving modifications to the particular plurality of key-value pairs as the particular interactive digital design is modified;
based on, at least in part, the modified plurality of key-value pairs, generating modified product description data of a modified interactive digital design;
generating a new token indicating the modified plurality of key-value pairs;
embedding the new token into the modified product description data.

14. The one or more non-transitory computer readable storage media of claim 11, wherein the plurality of key-value pairs captures a sequence of steps of an interactive process for creating the interactive digital design;
wherein the token captures manufacturing instructions for generating a sequence of frames corresponding to a sequence of steps of the interactive process for creating the interactive digital design;
wherein the one or more non-transitory computer readable storage media further store instructions for:
in response to receiving a request for a video file capturing the sequence of frames, transmitting product description data of the interactive design with the token embedded in the product description data to the computer collaboration server to cause the computer collaboration server to extract the token from the product description data, use the token to retrieve a corresponding plurality of key-value pairs, and use the corresponding plurality of key-value pairs to generate the video file.

15. The one or more non-transitory computer readable storage media of claim 11, storing additional instructions for:
displaying one or more graphical representations of one or more interactive digital designs;
in response to receiving a request for a particular digital image file of a particular graphical representation selected from the one or more graphical representations of the one or more interactive digital designs:
transmitting particular product description data of the particular graphical representation with the token embedded in the particular product description data to the computer collaboration server to cause the computer collaboration server to extract the token from the particular product description data, use the token to retrieve a corresponding plurality of key-value pairs, and use the corresponding plurality of key-value pairs to generate the particular digital image file.

16. The one or more non-transitory computer readable storage media of claim 11, wherein the token is represented as a universally unique identifier (UUID) uniquely identifying the token;
wherein the UUID is embedded in the product description data as a watermark;
wherein the UUID is embedded in the product description data in a frequency domain data of the product description data.

17. The one or more non-transitory computer readable storage media of claim 11, wherein the token is used to generate a 3D model of the interactive digital design.

18. The one or more non-transitory computer readable storage media of claim 11, wherein the token indicates a location at which the plurality of key-value pairs is stored.

19. The one or more non-transitory computer readable storage media of claim 11, wherein the plurality of key-value pairs includes one or more of:
an attribution key-value that includes an attribution key and a universally unique identifier that references a set of software instructions for manufacturing a corresponding product;
an age restriction key-value that includes an age restriction key and an age value;
a content lock key-value that includes a content lock key and a content lock key value;
a blacklist key-value that includes a blacklist key and a blacklist;
a whitelist key-value that includes a whitelist key and a whitelist;
wherein the ownership key-value further includes an ownership key and a user universally unique identifier (user ID);
a copyright key-value that includes a copyright key and a user ID;
a license key-value that includes a license key and a universally unique identifier for a specific license agreement held between an owner or a primary designer and a computer collaboration server; or
a customer support key-value that includes a support key and a support agent contract identifier;
wherein the product description data for the interactive digital design is generated as one or more modifications to the interactive digital design are received from one or more user interfaces and are used to update the interactive digital design.

20. The one or more non-transitory computer readable storage media of claim 11, wherein a pair, of the plurality of key-value pairs, indicates one or more of: an image type, a vector graphics, a 3D model, a text, a color, a surface quality, or a group attribute;
wherein the plurality of key-value pairs is used to perform one or more of: attribution-tracking, tracking ownership within a customization session, tracking licensing agreements of collaborators participating in the customization session, tracking copyrights and access privileges with respect to assets used and modified during the session, or tracking attributions of collaborators participating in the session.

\* \* \* \* \*